(12) United States Patent
McGibney et al.

(10) Patent No.: US 9,189,086 B2
(45) Date of Patent: Nov. 17, 2015

(54) INTERACTIVE INPUT SYSTEM AND INFORMATION INPUT METHOD THEREFOR

(75) Inventors: Grant McGibney, Calgary (CA); Tim Radke, Calgary (CA)

(73) Assignee: SMART Technologies ULC, Calgary (CA)

(*) Notice: Subject to any disclaimer, the term of this patent is extended or adjusted under 35 U.S.C. 154(b) by 457 days.

(21) Appl. No.: 12/752,882

(22) Filed: Apr. 1, 2010

(65) Prior Publication Data

US 2011/0242060 A1 Oct. 6, 2011

(51) Int. Cl.
*G06F 3/033* (2013.01)
*G06F 3/0354* (2013.01)
*G06F 3/042* (2006.01)

(52) U.S. Cl.
CPC .......... *G06F 3/03545* (2013.01); *G06F 3/0425* (2013.01); *G06F 3/0428* (2013.01)

(58) Field of Classification Search
CPC ............ G06F 3/03542; G06F 3/03545; G06F 3/0354; G06F 3/042; G06F 3/0421; G06F 3/0425; G06F 3/0428; G06F 3/033; G06F 3/0346; G06F 3/038; G06F 3/0383
See application file for complete search history.

(56) References Cited

U.S. PATENT DOCUMENTS

| | | | |
|---|---|---|---|
| 4,883,926 A * | 11/1989 | Baldwin | 178/19.01 |
| 5,448,263 A | 9/1995 | Martin | |
| 5,793,360 A * | 8/1998 | Fleck et al. | 345/179 |
| 5,818,421 A | 10/1998 | Ogino et al. | |
| 6,141,000 A | 10/2000 | Martin | |
| 6,153,836 A | 11/2000 | Goszyk | |
| 6,337,681 B1 | 1/2002 | Martin | |
| 6,421,042 B1 * | 7/2002 | Omura et al. | 345/157 |
| 6,441,362 B1 * | 8/2002 | Ogawa | 250/221 |
| 6,747,636 B2 | 6/2004 | Martin | |
| 6,803,906 B1 | 10/2004 | Morrison et al. | |
| 7,232,986 B2 | 6/2007 | Worthington et al. | |
| 7,236,162 B2 | 6/2007 | Morrison et al. | |
| 7,274,356 B2 | 9/2007 | Ung et al. | |
| 2001/0022579 A1 * | 9/2001 | Hirabayashi | 345/175 |
| 2004/0179001 A1 | 9/2004 | Morrison et al. | |
| 2005/0178953 A1 * | 8/2005 | Worthington et al. | 250/221 |
| 2005/0243070 A1 * | 11/2005 | Ung et al. | 345/176 |

(Continued)

FOREIGN PATENT DOCUMENTS

WO     01/63550 A2    8/2001

OTHER PUBLICATIONS

Transmittal; International Search Report; and Written Opinion of the International Searching Authority for International Application No. PCT/CA2011/000336, with a mailing date of Jul. 14, 2011.

(Continued)

*Primary Examiner* — Kathy Wang-Hurst
*Assistant Examiner* — Peijie Shen
(74) *Attorney, Agent, or Firm* — Katten Muchin Rosenman LLP

(57) ABSTRACT

An interactive input system comprises at least one imaging assembly having a field of view looking into a region of interest and capturing image frames and processing structure in communication with the at least one imaging assembly. When a pointer exists in captured image frames, the processing structure demodulates the captured image frames to determine frequency components thereof and examines the frequency components to determine at least one attribute of the pointer.

38 Claims, 22 Drawing Sheets

(56) References Cited

U.S. PATENT DOCUMENTS

2006/0012581 A1* 1/2006 Haim et al. ............... 345/173
2006/0028457 A1* 2/2006 Burns ....................... 345/179
2007/0070944 A1* 3/2007 Rinne et al. ............... 370/329
2007/0165007 A1 7/2007 Morrison et al.
2007/0188445 A1 8/2007 Silverstein et al.
2009/0160801 A1 6/2009 Morrison et al.
2009/0278794 A1* 11/2009 McReynolds et al. ........ 345/156

OTHER PUBLICATIONS

Extended European Search Report for European Patent Application No. 11 761 866.0 with a mailing date of Jul. 23, 2014.

* cited by examiner

INTERACTIVE INPUT SYSTEM AND INFORMATION INPUT METHOD THEREFOR

FIELD OF THE INVENTION

The present invention relates to an interactive input system and to an information input method therefor.

BACKGROUND OF THE INVENTION

Interactive input systems that allow users to inject input (eg. digital ink, mouse events etc.) into an application program using an active pointer (eg. a pointer that emits light, sound or other signal), a passive pointer (eg. a finger, cylinder or other object) or other suitable input device such as for example, a mouse or trackball, are well known. These interactive input systems include but are not limited to: touch systems comprising touch panels employing analog resistive or machine vision technology to register pointer input such as those disclosed in U.S. Pat. Nos. 5,448,263; 6,141,000; 6,337,681; 6,747,636; 6,803,906; 7,232,986; 7,236,162; and 7,274,356 assigned to SMART Technologies ULC of Calgary, Alberta, Canada, assignee of the subject application, the contents of which are incorporated by reference; touch systems comprising touch panels employing electromagnetic, capacitive, acoustic or other technologies to register pointer input; tablet personal computers (PCs); laptop PCs; personal digital assistants (PDAs); and other similar devices.

Above-incorporated U.S. Pat. No. 6,803,906 to Morrison et al. discloses a touch system that employs machine vision to detect pointer interaction with a touch surface on which a computer-generated image is presented. A rectangular bezel or frame surrounds the touch surface and supports digital cameras at its corners. The digital cameras have overlapping fields of view that encompass and look generally across the touch surface. The digital cameras acquire images looking across the touch surface from different vantages and generate image data. Image data acquired by the digital cameras is processed by on-board digital signal processors to determine if a pointer exists in the captured image data. When it is determined that a pointer exists in the captured image data, the digital signal processors convey pointer characteristic data to a master controller, which in turn processes the pointer characteristic data to determine the location of the pointer in (x,y) coordinates relative to the touch surface using triangulation. The pointer coordinates are conveyed to a computer executing one or more application programs. The computer uses the pointer coordinates to update the computer-generated image that is presented on the touch surface. Pointer contacts on the touch surface can therefore be recorded as writing or drawing or used to control execution of application programs executed by the computer.

U.S. Patent Application Publication No. 2004/0179001 to Morrison et al. discloses a touch system and method that differentiates between passive pointers used to contact a touch surface so that pointer position data generated in response to a pointer contact with the touch surface can be processed in accordance with the type of pointer used to contact the touch surface. The touch system comprises a touch surface to be contacted by a passive pointer and at least one imaging device having a field of view looking generally along the touch surface. At least one processor communicates with the at least one imaging device and analyzes images acquired by the at least one imaging device to determine the type of pointer used to contact the touch surface and the location on the touch surface where pointer contact is made. The determined type of pointer and the location on the touch surface where the pointer contact is made are used by a computer to control execution of an application program executed by the computer.

U.S. Patent Application Publication No. 2007/0165007 to Morrison et al. discloses an interactive input system comprising at least two imaging devices associated with a region of interest. The at least two imaging devices acquire images of the region of interest from different vantages and have overlapping fields of view. At least one receiver is operable to receive data output by an active pointer relating to the pointer status when the pointer is both within and outside of the fields of view of the imaging devices. Processing structure processes data acquired by the at least two imaging devices and the at least one receiver to detect the existence of an active pointer and to determine the location of the pointer within the region of interest.

Although many different types of interactive input systems exist, improvements to such interactive input systems are continually being sought. It is therefore an object of the present invention to provide a novel interactive input system and an information input method therefor.

SUMMARY OF THE INVENTION

Accordingly, in one aspect there is provided an interactive input system comprising at least one imaging assembly having a field of view looking into a region of interest and capturing image frames; and processing structure in communication with the at least one imaging assembly, when a pointer exists in captured image frames, said processing structure demodulating the captured image frames to determine frequency components thereof and examining the frequency components to determine at least one attribute of said pointer.

According to another aspect there is provided a method of inputting information into an interactive input system comprising capturing image frames of a region of interest; and when a pointer exists in captured image frames, demodulating the captured image frames to determine frequency components thereof and examining the frequency components to determine at least one attribute of the pointer.

BRIEF DESCRIPTION OF THE DRAWINGS

Embodiments will now be described more fully with reference to the accompanying drawings in which.

DETAILED DESCRIPTION OF THE EMBODIMENTS

Figure 1:
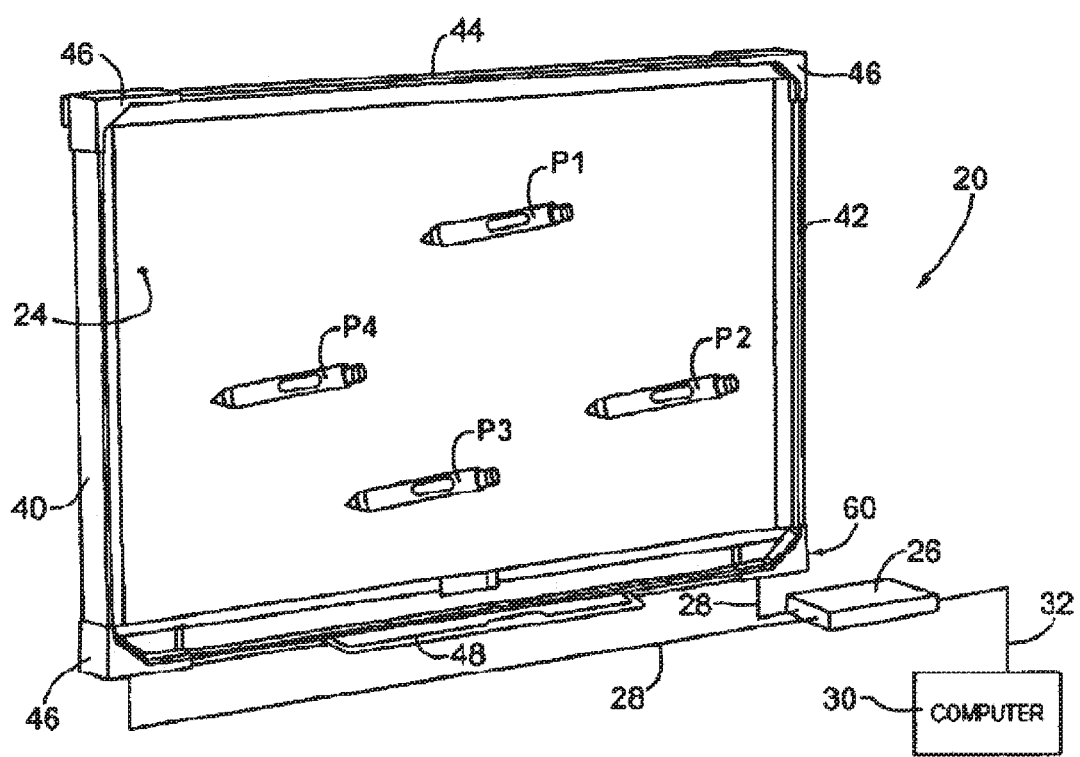
FIG. 1 is a schematic perspective view of an interactive input system.
Figure 2:
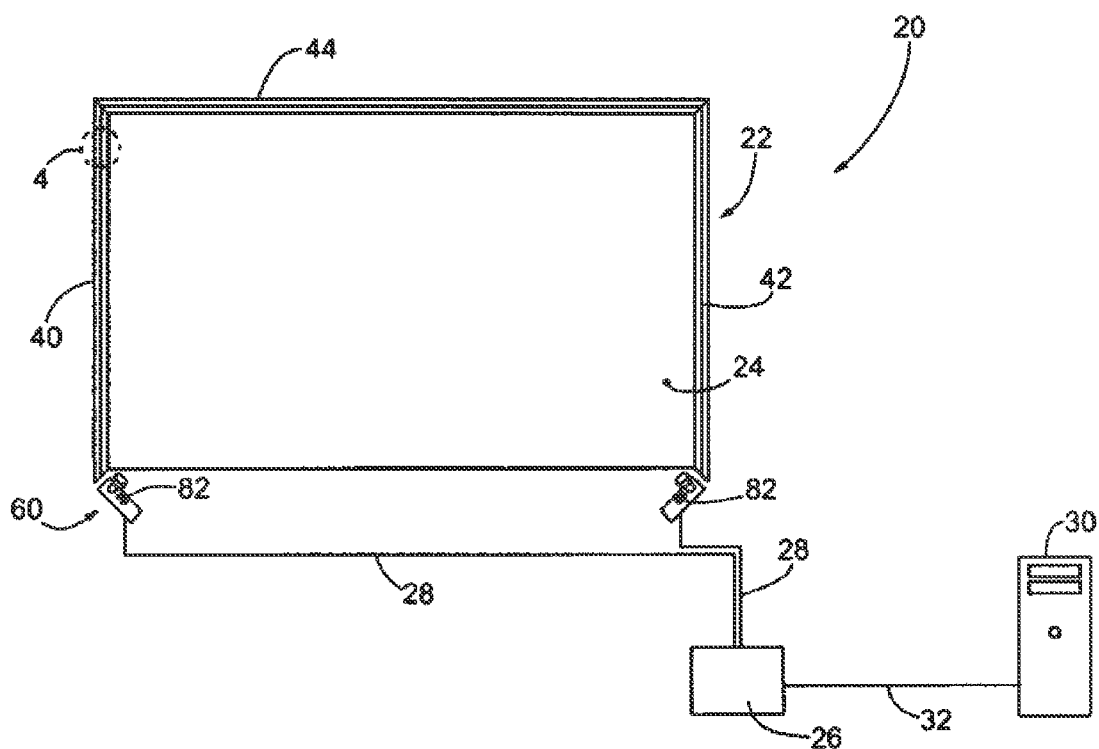
FIG. 2 is a schematic front view of the interactive input system of FIG. 1.

Turning now to FIGS. 1 and 2, an interactive input system that allows a user to inject input such as digital ink, mouse events etc. into an application program is shown and is generally identified by reference numeral 20. In this embodiment, interactive input system 20 comprises an assembly 22 that engages a display unit (not shown) such as for example, a plasma television, a liquid crystal display (LCD) device, a flat panel display device, a cathode ray tube (CRT) monitor etc. and surrounds the display surface 24 of the display unit. The assembly 22 employs machine vision to detect one or more pointers $P_1$ to $P_4$ brought into a region of interest in proximity with the display surface 24 and communicates with a digital signal processor (DSP) unit 26 via communication lines 28. The communication lines 28 may be embodied in a serial bus, a parallel bus, a universal serial bus (USB), an Ethernet connection or other suitable wired connection. Alternatively, the assembly 22 may communicate with the DSP unit 26 over a wireless connection using a suitable wireless protocol such as for example Bluetooth, WiFi, ZigBee, ANT, IEEE 802.15.4, Z-Wave etc. The DSP unit 26 in turn communicates with a general purpose computing device 30 executing one or more application programs via a USB cable 32. Alternatively, the DSP unit 26 may communicate with the general purpose computing device 30 over another wired connection such as for example, a parallel bus, an RS-232 connection, an Ethernet connection etc. or may communicate with the general purpose computing device 30 over a wireless connection using a suitable wireless protocol such as for example Bluetooth, WiFi, ZigBee, ANT, IEEE 802.15.4, Z-Wave etc. General purpose computing device 30 processes the output of the assembly 22 received via the DSP unit 26 and adjusts image data that is output to the display unit so that the image presented on the display surface 24 reflects pointer activity. In this manner, the assembly 22, DSP unit 26 and general purpose computing device 30 allow pointer activity proximate to the display surface 24 to be recorded as writing or drawing or used to control execution of one or more application programs executed by the computer 30.

Assembly 22 comprises a frame assembly that is mechanically attached to the display unit and surrounds the display surface 24. Frame assembly comprises a bezel having three bezel segments 40, 42 and 44, four corner pieces 46 and a tool tray segment 48. Bezel segments 40 and 42 extend along opposite side edges of the display surface 24 while bezel segment 44 extends along the top edge of the display surface 24. The tool tray segment 48 extends along the bottom edge of the display surface 24 and supports one or more pen tools P. The corner pieces 46 adjacent the top left and top right corners of the display surface 24 couple the bezel segments 40 and 42 to the bezel segment 44. The corner pieces 46 adjacent the bottom left and bottom right corners of the display surface 24 couple the bezel segments 40 and 42 to the tool tray segment 48. In this embodiment, the corner pieces 46 adjacent the bottom left and bottom right corners of the display surface 24 accommodate imaging assemblies 60 that look generally across the entire display surface 24 from different vantages. The bezel segments 40, 42 and 44 are oriented so that their inwardly facing surfaces are seen by the imaging assemblies 60.

Figure 3:
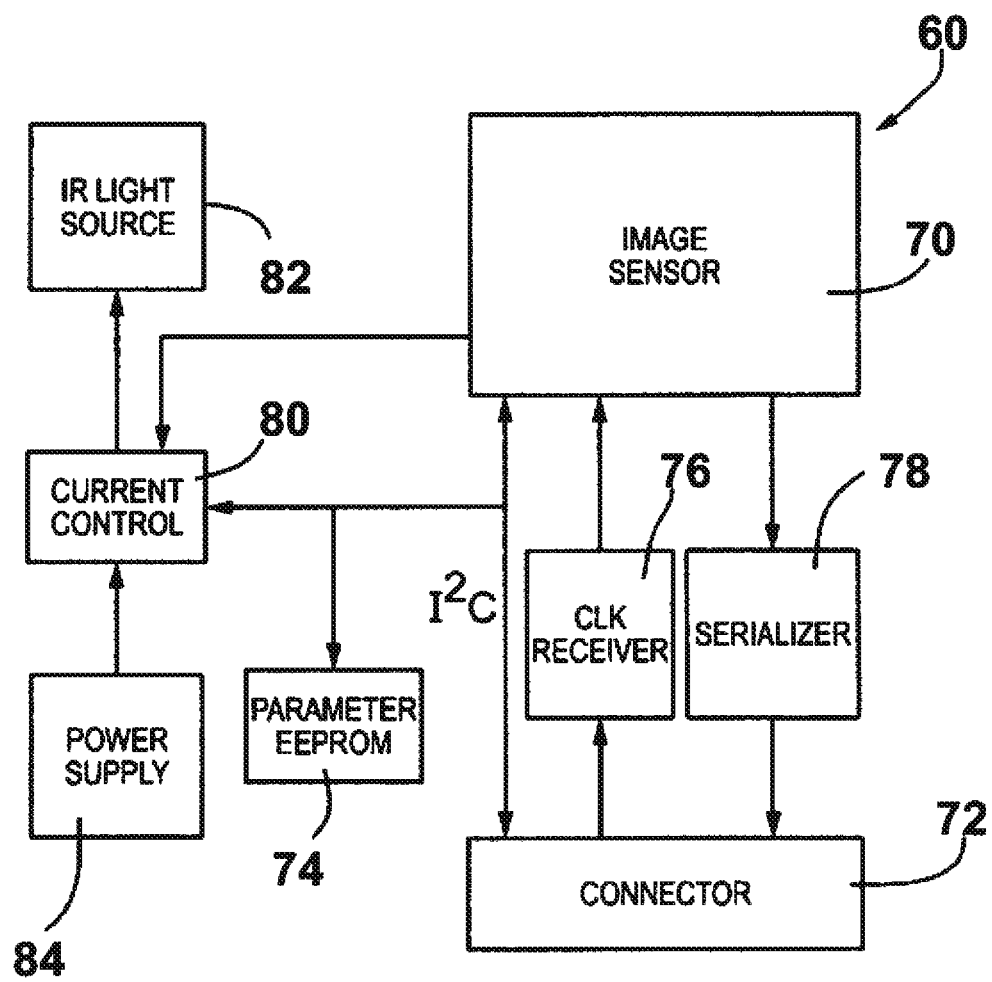
FIG. 3 is a block diagram of an imaging assembly forming part of the interactive input system of FIG. 1.

Turning now to FIG. 3, one of the imaging assemblies 60 is better illustrated. As can be seen, the imaging assembly 60 comprises an image sensor 70 such as that manufactured by Micron under Model No. MT9V022 fitted with an 880 nm lens of the type manufactured by Boowon under Model No. BW25B. The lens has an IR-pass/visible light blocking filter thereon (not shown) and provides the image sensor 70 with approximately a 98 degree field of view so that the entire display surface 24 is seen by the image sensor 70. The image sensor 70 is connected to a connector 72 that receives one of the communication lines 28 via an I²C serial bus. The image sensor 70 is also connected to an electrically erasable programmable read only memory (EEPROM) 74 that stores image sensor calibration parameters as well as to a clock (CLK) receiver 76, a serializer 78 and a current control module 80. The clock receiver 76 and the serializer 78 are also connected to the connector 72. Current control module 80 is also connected to an infrared (IR) light source 82 comprising one or more IR light emitting diodes (LEDs) and associated lens assemblies as well as to a power supply 84 and the connector 72.

The clock receiver 76 and serializer 78 employ low voltage, differential signaling (LVDS) to enable high speed communications with the DSP unit 26 over inexpensive cabling. The clock receiver 76 receives timing information from the DSP unit 26 and provides clock signals to the image sensor 70 that determines the rate at which the image sensor 70 captures and outputs image frames. Each image frame output by the image sensor 70 is serialized by the serializer 78 and output to the DSP unit 26 via the connector 72 and communication lines 28.

In this embodiment, the inwardly facing surface of each bezel segment 40, 42 and 44 comprises a single, longitudinally extending strip or band of retro-reflective material. To take best advantage of the properties of the retro-reflective material, the bezel segments 40, 42 and 44 are oriented so that their inwardly facing surfaces extend in a plane generally normal to that of the display surface 24.

Figure 4:
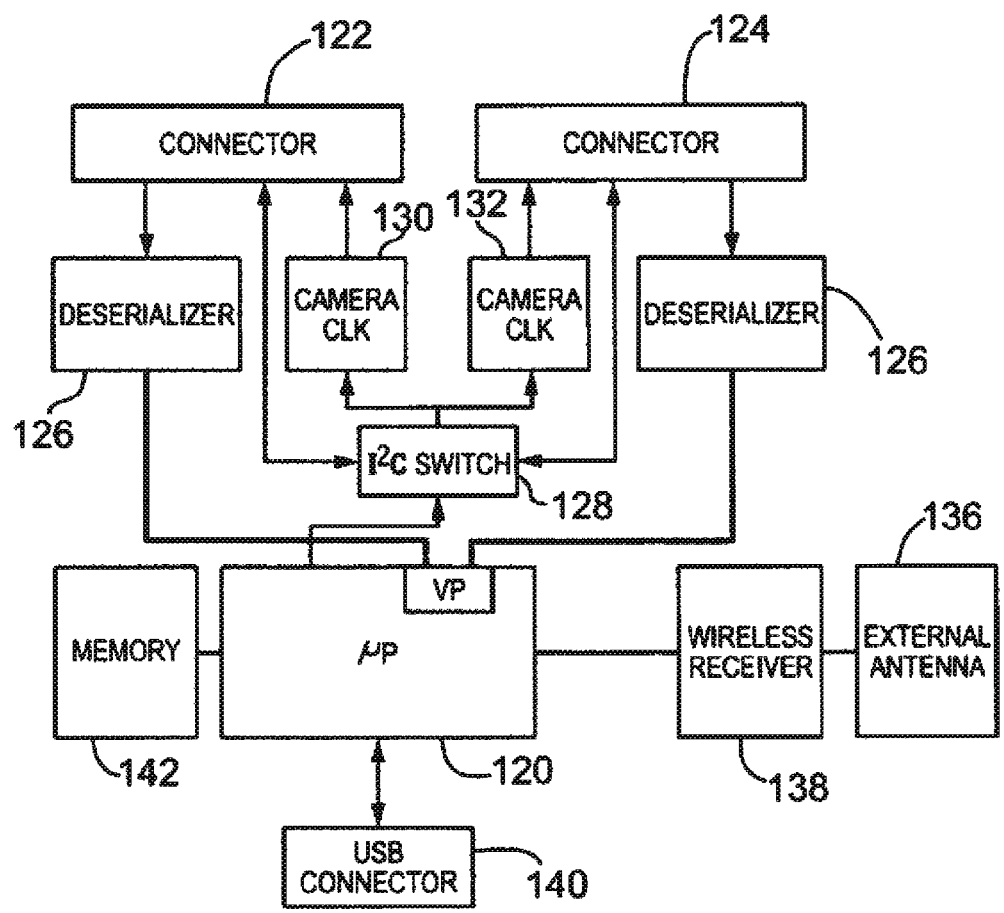
FIG. 4 is a block diagram of a master controller forming part of the interactive input system of FIG. 1.

Turning now to FIG. 4, the DSP unit 26 is better illustrated. As can be seen, DSP unit 26 comprises a controller 120 such as for example, a microprocessor, microcontroller, DSP, other suitable processing structure etc. having a video port VP connected to connectors 122 and 124 via deserializers 126. The controller 120 is also connected to each connector 122, 124 via an I²C serial bus switch 128. I²C serial bus switch 128 is connected to clocks 130 and 132, each clock of which is connected to a respective one of the connectors 122, 124. The controller 120 communicates with a USB connector 140 that receives USB cable 32 and memory 142 including volatile and non-volatile memory. The clocks 130 and 132 and deserializers 126 similarly employ low voltage, differential signaling (LVDS).

The general purpose computing device 30 in this embodiment is a personal computer or the like comprising, for example, a processing unit, system memory (volatile and/or non-volatile memory), other non-removable or removable memory (e.g. a hard disk drive, RAM, ROM, EEPROM, CD-ROM, DVD, flash memory, etc.) and a system bus coupling the various computer components to the processing unit. The general purpose computing device may also comprise a network connection to access shared or remote drives, one or more networked computers, or other networked devices. Pointer data received by the general purpose computing device from the imaging assemblies 60 is processed to generate pointer location data as will be described.

The interactive input system 20 is able to detect passive pointers such as for example, a user's finger, a cylinder or other suitable object as well as active pen tools P that are brought into proximity with the display surface 24 and within the fields of view of the imaging assemblies 60.

Figure 5:
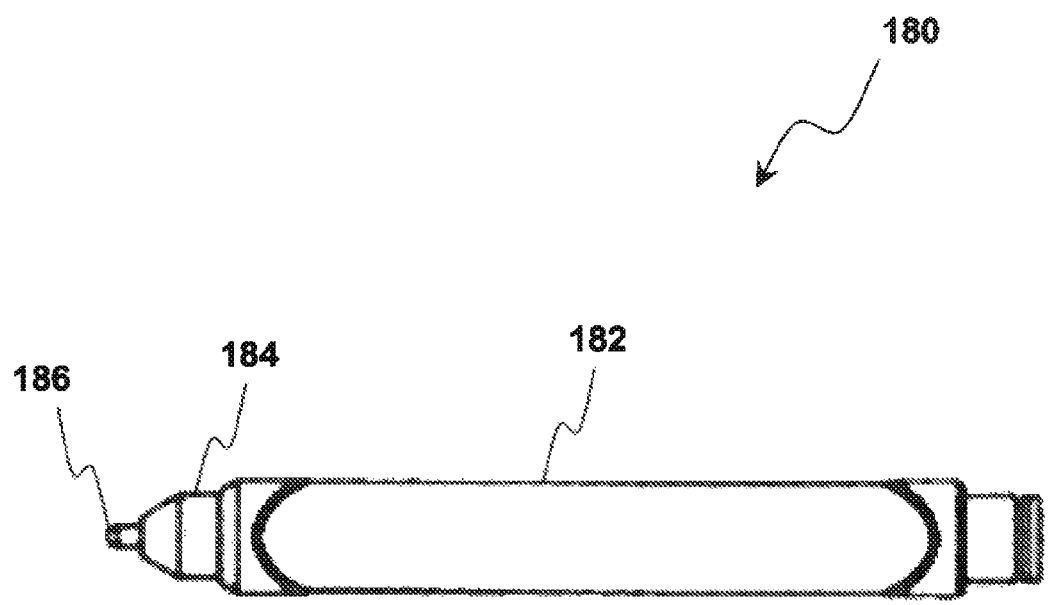
FIG. 5 is a side elevational view of an active pen tool for use with the interactive input system of FIG. 1.

FIG. 5 shows an active pen tool 180 for use with the interactive input system 20. The pen tool 180 has a main body 182 terminating in a frustoconical tip 184. The tip 184 houses one or more miniature infrared light emitting diodes (IR LEDs) (not shown). The infrared LEDs are powered by a battery (not shown) also housed in the main body 182. Protruding from the tip 184 is an actuator 186 that resembles a nib. Actuator 186 is biased out of the tip 184 by a spring (not shown) but can be pushed into the tip 184 upon application of pressure thereto. The actuator 186 is connected to a switch (not shown) within the main body 182 that closes a circuit to power the IR LEDs when the actuator 186 is pushed against the spring bias into the tip 184. With the IR LEDs powered, the pen tool 180 emits infrared light or radiation from its tip 184. In this embodiment, the infrared light emitted by the pen tool 180 is modulated according to one of a plurality of subcarrier frequency combinations, as will be described, to provide additional pointer information to the interactive input system 20.

During operation, the controller 120 conditions the clocks 130 and 132 to output clock signals that are conveyed to the imaging assemblies 60 via the communication lines 28. The clock receiver 76 of each imaging assembly 60 uses the clock signals to set the frame rate of the associated image sensor 70. In this embodiment, the controller 120 generates clock signals so that the frame rate of each image sensor 70 is eight (8) times the desired image frame output rate. The controller 120 also signals the current control module 80 of each imaging assembly 60 over the I²C serial bus. In response, each current control module 80 initially connects the IR light source 82 to the power supply 84 and then disconnects the IR light source 82 from the power supply 84. The timing of the on/off IR light source switching is controlled so that for any given sequence of successive image frames captured by each image sensor 70, one image frame is captured when the IR light sources 82 are on and the successive image frame is captured when the IR light sources 82 are off.

When the IR light sources 82 are on, the IR light sources 82 flood the region of interest over the display surface 24 with infrared illumination. Infrared illumination that impinges on the retro-reflective bands 102 of bezel segments 40, 42 and 44 is returned to the imaging assemblies 60. As a result, in the absence of a pointer P, each imaging assembly 60 sees a bright band 160 having a substantially even intensity over its length as shown in "Image 1" of FIG. 6. Each imaging assembly 60 also sees artifacts 702 resulting from ambient light. When a pointer P is brought into proximity with the display surface 24, the pointer occludes infrared illumination reflected by the retro-reflective bands 102. As a result, each imaging assembly sees a region that interrupts the bright band 160 in captured image frames. If the pointer P is an active pen tool 180, the pointer will have an illuminated appearance as seen by each imaging assembly 60 as will be described.

When the IR light sources 82 are off, no infrared illumination impinges upon the retro-reflective bands 102 of bezel segments 40, 42 and 44. Consequently, the image sensor 70 of each imaging assembly 60 does not see the retro-reflective bands 102. Each imaging assembly 60 does however see artifacts 702 resulting from ambient light on a dark background, as is shown in "Image 2" of FIG. 6. If a pointer is in proximity with the display surface 24 when the IR light sources 82 are off and the pointer is an active pen tool 180, each imaging assembly 60 will also see the illuminated pen tool 180.

Figure 7:
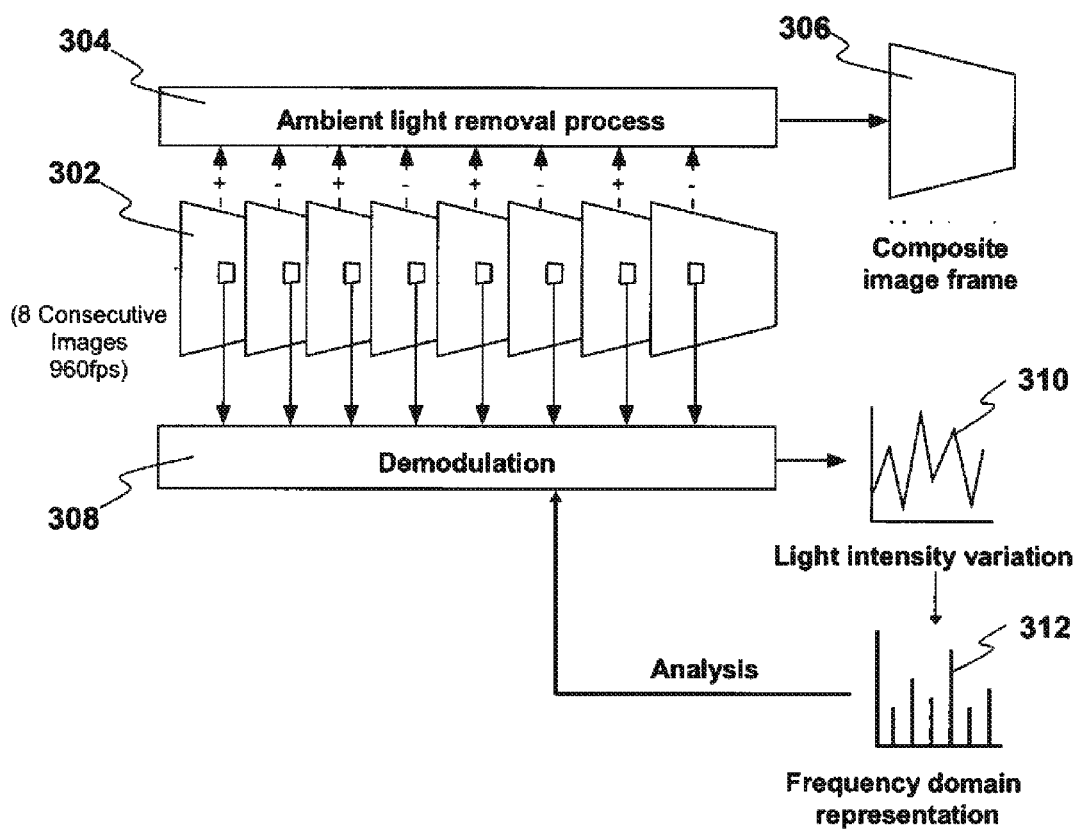
FIG. 7 is a schematic view of an image processing method used by the interactive input system of FIG. 1.

A schematic overview of the image frame processing method employed by the interactive input system 20 is shown in FIG. 7. As mentioned above, each image frame 302 output by the image sensor 70 of each imaging assembly 60 is conveyed to the DSP unit 26. To reduce the effects ambient light may have on pointer discrimination, the DSP unit 26 subjects the captured image frames received from each imaging assembly 60 to an ambient light removal process 304. There are generally three categories of unwanted light that is visible to the imaging assemblies 60, and which is subject to removal by the ambient light removal process 304. These categories of unwanted light comprise light originating from the operating environment surrounding the interactive input system 20, light emitted by the display unit, and infrared illumination emitted by the IR light sources 82 that is scattered off of objects proximate to the imaging assemblies 60.

During the ambient light removal process 304, successive image frames received from each imaging assembly 60 are added and subtracted, which serves as a temporal filter to remove light that is contributed by sources that are not oscillating at the frequency of the IR light sources 82. The ambient light removal process also removes light of certain modulation frequencies that are different from the oscillating frequency of the IR light sources 82 and which, as described below, are used by the active pen tool 180 to communicate information to the interactive input system 20.

As mentioned above, each imaging assembly 60 captures successive images frames 302 using alternating illumination, with one image frame 302 captured with the IR light sources 82 on (+) and the successive image frame 302 captured with the IR light sources 82 off (−) and conveys the captured image frames to the DSP unit 26. In this embodiment, the image frame capture rate is 960 frames per second. As each image frame 302 is received, the controller 120 stores the image frame 302 in a buffer.

For each imaging assembly 60, once eight (8) successive image frames 302 are available, the DSP unit 26 subtracts each (−) image frame from the previous (+) image frame to produce a series of four difference image frames. The four difference image frames are then summed to form a single composite image frame 306, which is effectively captured at a reduced frame rate of 120 frames per second. The retro-reflective bands on the bezel segments 40, 42 and 44 appear as a bright band 160 in the composite image frame 306, and light contributed by light sources that are constant and by the active pen tool 180 are filtered out to black.

Figure 8:
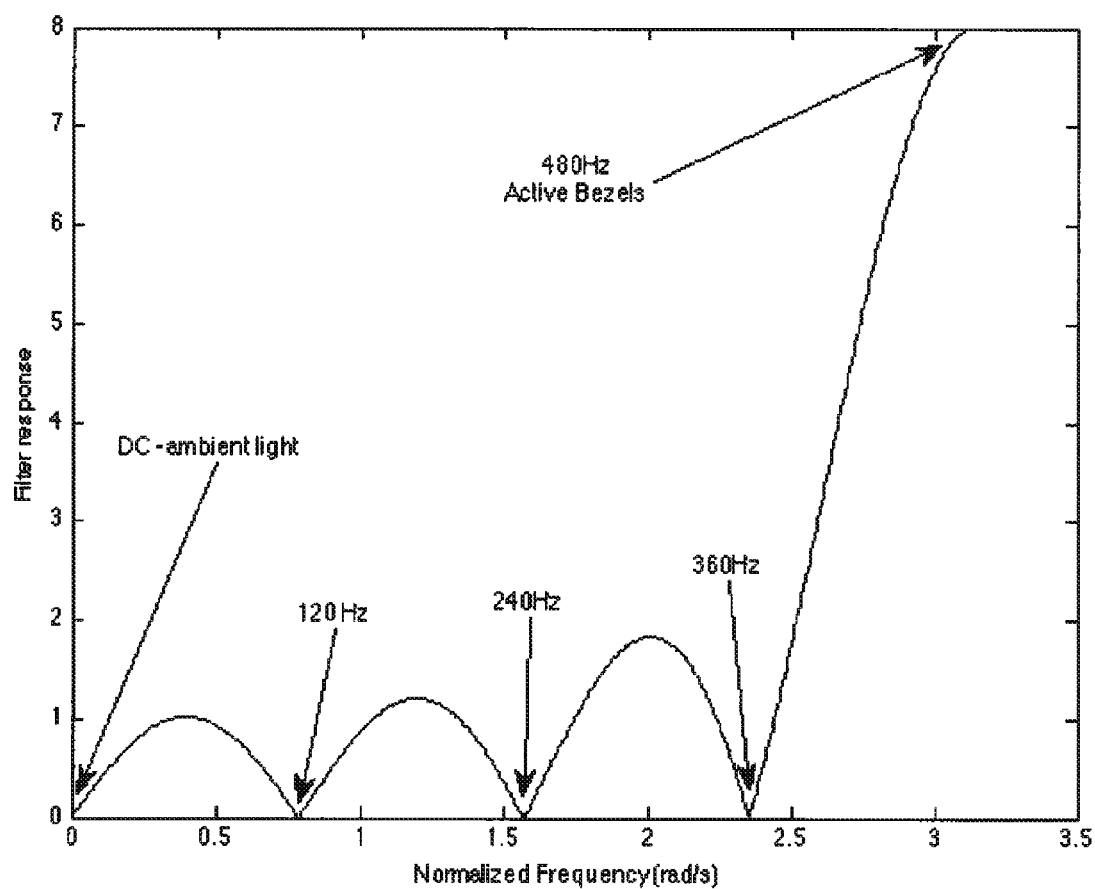
FIG. 8 is a graphical plot of the frequency response of an ambient light filter.

The process of adding and subtracting alternating image frames is equivalent to applying a discrete time filter with a transfer function described by:

$$H(z)=1-z^{-1}+z^{-2}-z^{-3}+z^{-4}-z^{-5}+z^{-6}-z^{-7}$$

to each pixel in the sequence of image frames, followed by a decimation of the series of eight filtered image frames, so as to reduce the image frame rate from 960 frames per second down to an effective 120 frames per second by keeping every eighth filter output. The frequency response of this discrete time filter is plotted graphically in FIG. 8, and has a passband centered at 480 Hz which, in this embodiment, corresponds to the oscillation frequency of the IR light sources 82. The 480 Hz passband allows the light emitted by the IR light sources 82 (at 480 Hz) and reflected from the bezel segments 40, 42 and 44 to pass through the discrete time filter. Additionally, the discrete time filter has a null frequency at 0 Hz, which corresponds to the frequency at which most ambient light exists. The discrete time filter also has null frequencies centered at 120 Hz, 240 Hz, and 360 Hz, which correspond to subcarrier frequencies used for modulating the IR light emitted by the active pen tool 180, as will be described. Light emitted by the active pen tool 180 that is modulated at frequencies of 0 Hz, 120 Hz, 240 Hz, and 360 Hz will be filtered out, and will not appear in the composite image frame 306. Ambient light at frequencies of 0 Hz and/or 120 Hz is also filtered out. After decimating the image frame rate down to 120 frames per second, the retro-reflective bands on the bezel segments 40, 42 and 44 appear as a generally constant bright band 160 in the composite image frame 306. The composite image frame 306 is therefore a high contrast image of the bright band 160 on a dark background interrupted by one or more regions 162 if one or more pointers are in proximity with the display surface 24. As will be appreciated, an advantage of using the discrete time filter is that the same triangulation algorithms can be used with both passive pointers and active pen tools.

Once the composite image frame 306 has been generated, the controller 120 examines the intensity of the composite image frame for values that represent the bezel and possibly a pointer. In particular, the controller 120 calculates normalized intensity values I(x) for the pixel columns of the composite image frame 306. As will be appreciated, the intensity values I(x) remain high and uninterrupted for the pixel columns of the composite image frame 306 corresponding to the regions where the bezel is not occluded by a pointer, and the intensity values I(x) drop to low values at a region corresponding to the location of a pointer in the composite image frame 306.

Once the intensity values I(x) for the pixel columns of the composite image frame 306 have been determined, the resultant I(x) curve for the composite image frame is examined to determine if the I(x) curve falls below a threshold value signifying the existence of a pointer and if so, to detect left and right edges in the I(x) curve that represent opposite sides of the pointer. In particular, in order to locate left and right edges in the composite image frame 306, the first derivative of the I(x) curve is computed to form a gradient curve $\nabla I(x)$. If the I(x) curve drops below the threshold value signifying the existence of a pointer, the resultant gradient curve $\nabla I(x)$ will include a region bounded by a negative peak and a positive peak representing the edges formed by the dip in the I(x) curve. In order to detect the peaks and hence the boundaries of the region, the gradient curve $\nabla I(x)$ is subjected to an edge detector.

In particular, a threshold T is first applied to the gradient curve $\nabla I(x)$ so that, for each position x, if the absolute value of the gradient curve $\nabla I(x)$ is less than the threshold, that value of the gradient curve $\nabla I(x)$ is set to zero as expressed by:

$$\nabla I(x)=0, \text{ if } |\nabla I(x)|<T$$

Following the thresholding procedure, the thresholded gradient curve $\nabla I(x)$ contains a negative spike and a positive spike corresponding to the left edge and the right edge representing the opposite sides of the pointer, and is zero elsewhere. The left and right edges, respectively, are then detected from the two non-zero spikes of the thresholded gradient curve $\nabla I(x)$. To calculate the left edge, the centroid distance $CD_{left}$ is calculated from the left spike of the thresholded gradient curve $\nabla I(x)$ starting from the pixel column $X_{left}$ according to:

$$CD_{left} = \frac{\sum_i (x_i - X_{left})\nabla I(x_i)}{\sum_i \nabla I(x_i)}$$

where $x_i$ is the pixel column number of the i-th pixel column in the left spike of the gradient curve $\nabla I(x)$, i is iterated from 1 to the width of the left spike of the thresholded gradient curve $\nabla I(x)$ and $X_{left}$ is the pixel column associated with a value along the gradient curve $\nabla I(x)$ whose value differs from zero (0) by a threshold value determined empirically based on system noise. The left edge in the thresholded gradient curve $\nabla I(x)$ is then determined to be equal to $X_{left}+CD_{left}$.

To calculate the right edge, the centroid distance $CD_{right}$ is calculated from the right spike of the thresholded gradient curve $\nabla I(x)$ starting from the pixel column $X_{right}$ according to:

$$CD_{right} = \frac{\sum_j (x_i - X_{right})\nabla I(x_j)}{\sum_j \nabla I(x_j)}$$

where $x_j$ is the pixel column number of the j-th pixel column in the right spike of the thresholded gradient curve $\nabla I(x)$, j is iterated from 1 to the width of the right spike of the thresholded gradient curve $\nabla I(x)$ and $X_{right}$ is the pixel column associated with a value along the gradient curve $\nabla I(x)$ whose value differs from zero (0) by a threshold value determined empirically based on system noise. The right edge in the thresholded gradient curve is then determined to be equal to $X_{right}CD_{right}$.

Once the left and right edges of the thresholded gradient curve $\nabla I(x)$ are calculated, the midpoint between the identified left and right edges is then calculated thereby to determine the location of the pointer in the composite image frame 306.

Figure 6:
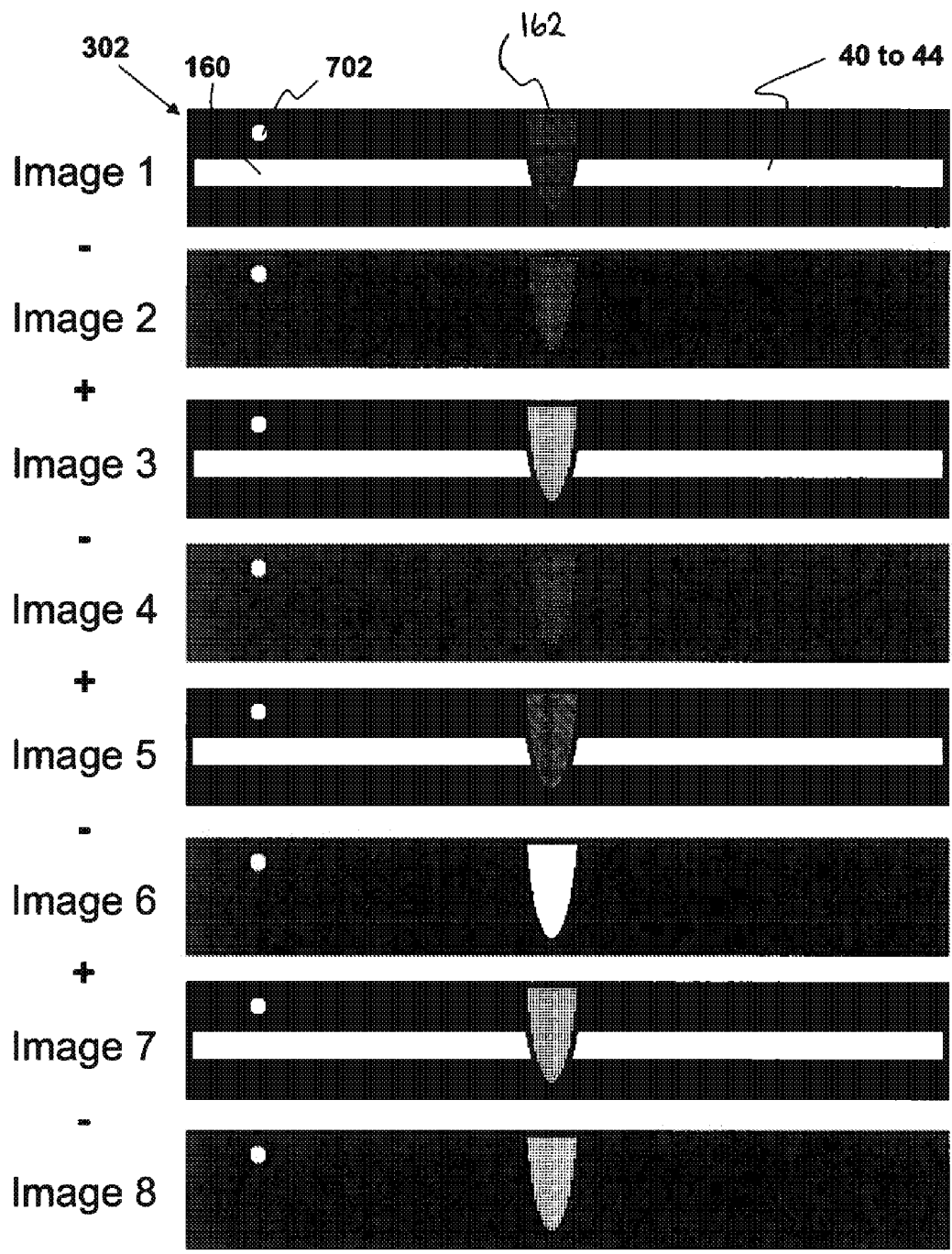
FIG. 6 shows a sequence of eight consecutive image frames captured by the imaging assembly of FIG. 3 when the active pen tool of FIG. 5 is in the field of view of the imaging assembly and is emitting radiation modulated according to a subcarrier frequency combination.
Figure 9:
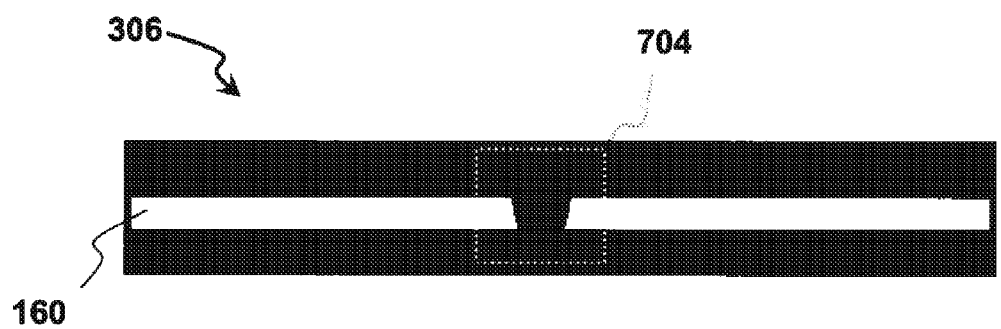
FIG. 9 is a composite image frame formed from the image frames of FIG. 6.

The controller 120 then defines a square-shaped pointer analysis region 704 that is generally centered on the pointer location as shown in FIG. 9 in order to determine if pointer information represented by a subcarrier frequency combination has been received. If an active pen tool 180 is within the pointer analysis region 704, the pen tool 180 will have a bright appearance as a result of the IR light emitted thereby. In this embodiment, the amplitude of the IR light emitted by the pen tool 180 is varied using a combination of three subcarrier frequencies, namely 120 Hz, 240 Hz, and 360 Hz, and whereby the amplitude is varied sinusoidally at each subcarrier frequency used. A dc bias is applied to the IR illumination to prevent the total light intensity from having a negative value when the sinusoidal signals are added. FIG. 6 shows eight consecutive image frames captured by an imaging assembly 60 when an active pen tool 180 is in proximity with the display surface 24. As can be seen, the intensity of the bright region in the image frames representing the pen tool 180 varies as a result of the modulated IR illumination emitted by the pen tool 180.

Figure 10:
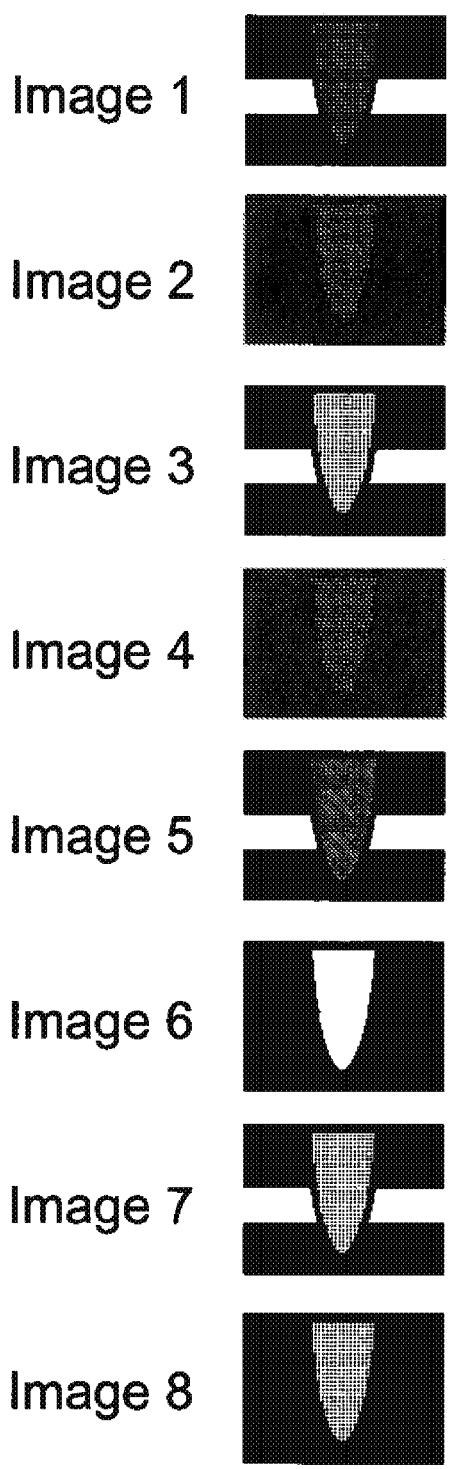
FIG. 10 shows a sequence of image frames formed by applying a pointer analysis region to the image frames of FIG. 6.
Figure 11:
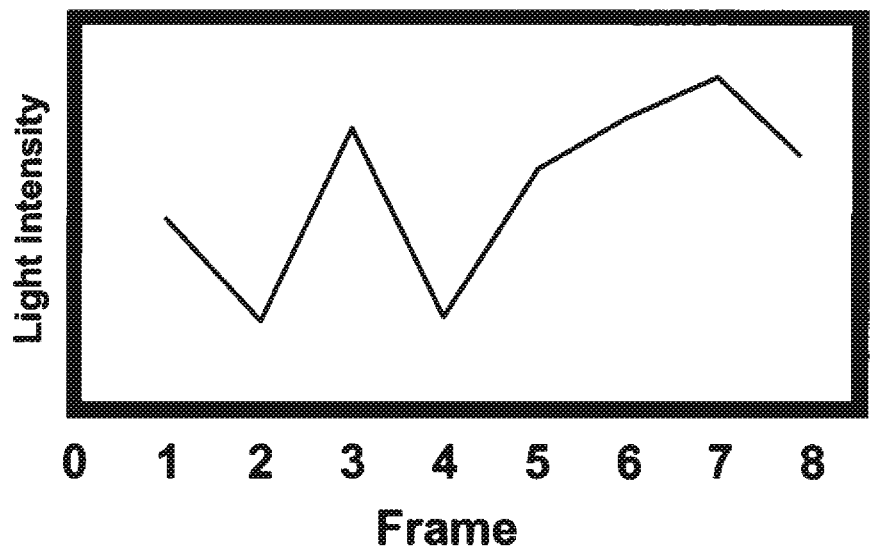
FIG. 11 is a graphical plot of the light intensity variation of the image frames of FIG. 10.
Figure 12:
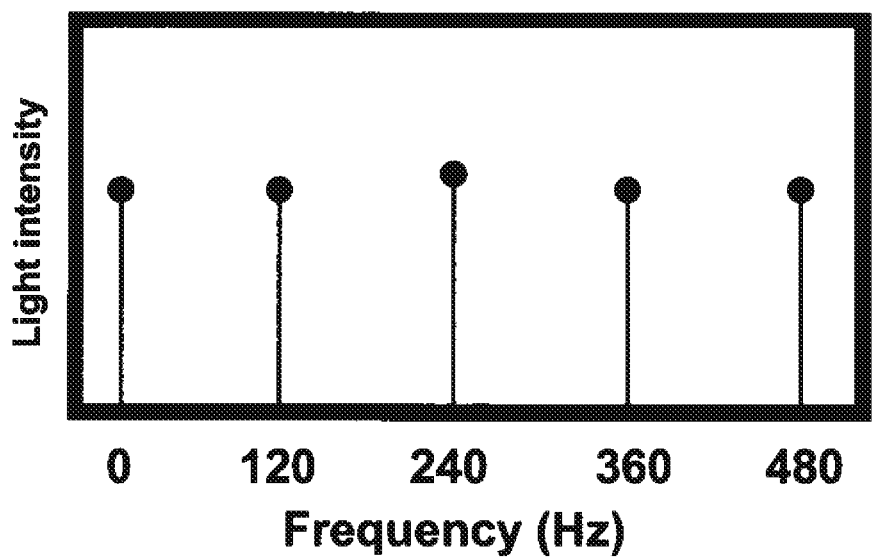
FIG. 12 is a graphical plot of the frequency domain representation of the image frame light intensity variation of FIG. 11.

Having defined the pointer analysis region 704, the DSP unit 26 applies the pointer analysis region 704 to each of the eight (8) captured image frames 302 stored in the buffer. The regions of the image frames 302 corresponding to the pointer analysis region 704 are illustrated in FIG. 10. The DSP unit 26 then carries out a demodulation 308 of the measured light intensity within the regions of the image frames 302 corresponding to the pointer analysis region 704. Here, the total light intensity within the region is measured for each image frame 302. This measured total light intensity is dealt with as a function of image frame number and gives rise to a light intensity variation 310. An example of such a light intensity variation 310 is graphically plotted in FIG. 11. The DSP unit 26 then performs a transform on the light intensity variation 310 to yield a frequency domain representation 312 of light intensity, which is plotted graphically in FIG. 12. In this embodiment, the transform is a discrete Fourier transform, but those of skill in the art will understand that any transform from the time domain to the frequency domain may be used. For a frame rate of 960 frames per second, an eight point discrete Fourier transform will report frequencies of 0 Hz, 120 Hz, 240 Hz, 360 Hz, and 480 Hz. The measurement at 0 Hz represents light from all constant light sources, including ambient light and the bias applied to active pen tool IR illumination, and is discarded. The measurement at 480 Hz represents light from the oscillating IR light sources 82 and is also discarded. The remaining measurements at 120 Hz, 240 Hz, and 360 Hz represent modulated subcarriers emitted by the active pen tool 180.

The available carrier frequencies used by active pen tools 180, and the illumination rate of the IR light sources 82, are dependent on the frame rate (i.e. the frame capture rate) of the image sensors 70. In this embodiment as mentioned previously, the frame rate is 960 frames per second. Therefore, to avoid aliasing at this frame rate, the upper limit of modulation frequency used for the IR light sources 82 is 480 Hz. The discrete time filter has null frequencies at 120 Hz, 240 Hz and 360 Hz. As will be appreciated, an additional advantage of placing the null frequencies at these frequencies is that the discrete time filter removes modulated IR illumination emitted by pen tools 180 during processing of the image frames to determine pointer location, and also removes any frequency harmonics associated with AC power supplied to the operating environment of interactive input system 20 that could otherwise interfere with the image processing algorithms.

The three available subcarrier frequencies, namely 120 Hz, 240 Hz, and 360 Hz, that are used by the active pen tool 180 to modulate emitted IR light correspond to the normalized frequencies pi/4, pi/2 and 3pi/4 of the maximum modulation frequency (480 Hz). Each active pen tool 180 may modulate the emitted IR light using a different combination of the three subcarrier frequencies. This permits a total of eight (or $2^n$, where n is the number of subcarrier frequencies available) different subcarrier frequency combinations each having a unique modulation pattern that can be recognized by the interactive input system 20. The combination with all three subcarrier frequencies off is reserved by the interactive input system 20 for pointers that are not active pen tools, such as, for example, a finger. This provides seven other unique subcarrier frequency combinations for use with active pen tools 180. As each unique subcarrier frequency combination can be assigned to a different respective pen tool 180, this information enables the identity of the active pen tool to be recognized by the interactive input system 20. As will be appreciated, this information may be used to represent an attribute of the pen tool, such as pen colour or functionality (e.g. passive pointer/no functionality, left mouse click, right mouse click, black, red, green, blue, and eraser, respectively), or it may be used to represent a different user (e.g. users 1 through 8, respectively). The eight subcarrier frequency combinations are tabulated below in Table 1.

TABLE 1

| Combination no. | Subcarrier #1 | Subcarrier #2 | Subcarrier #3 |
| --- | --- | --- | --- |
| 1 | off | off | off |
| 2 | on | off | off |
| 3 | off | on | off |
| 4 | off | off | on |
| 5 | on | on | off |
| 6 | on | off | on |
| 7 | off | on | on |
| 8 | on | on | on |

Figure 13A:
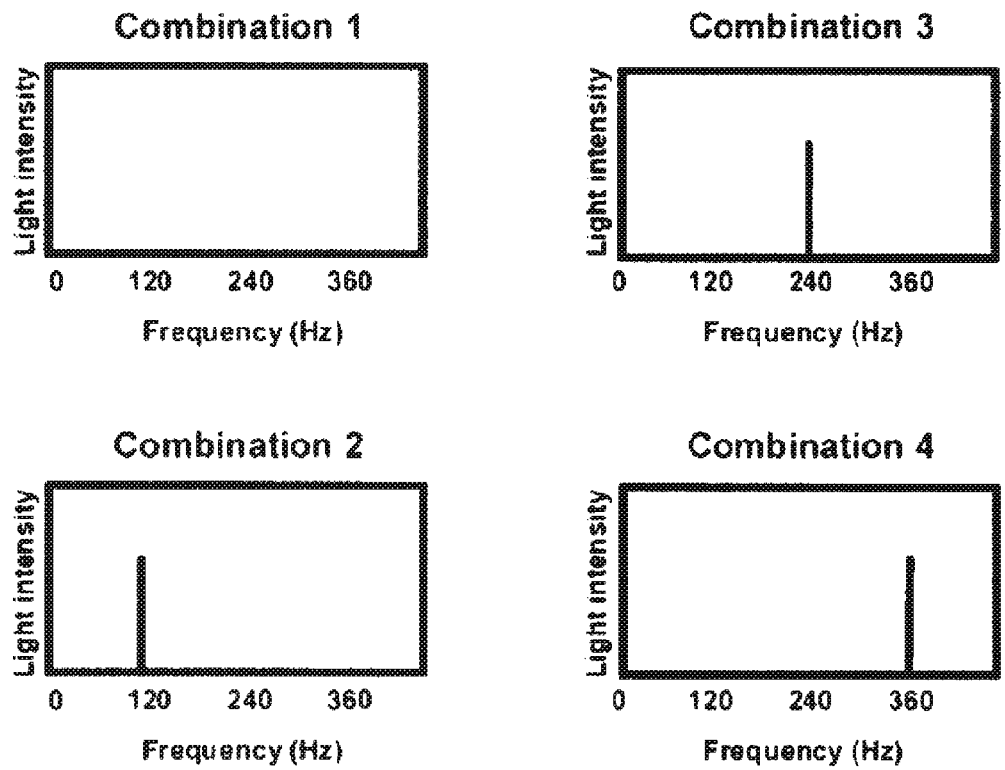
FIGS. 13a and 13b are graphical plots showing frequency domain representations of eight subcarrier frequency combinations.
Figure 13B:
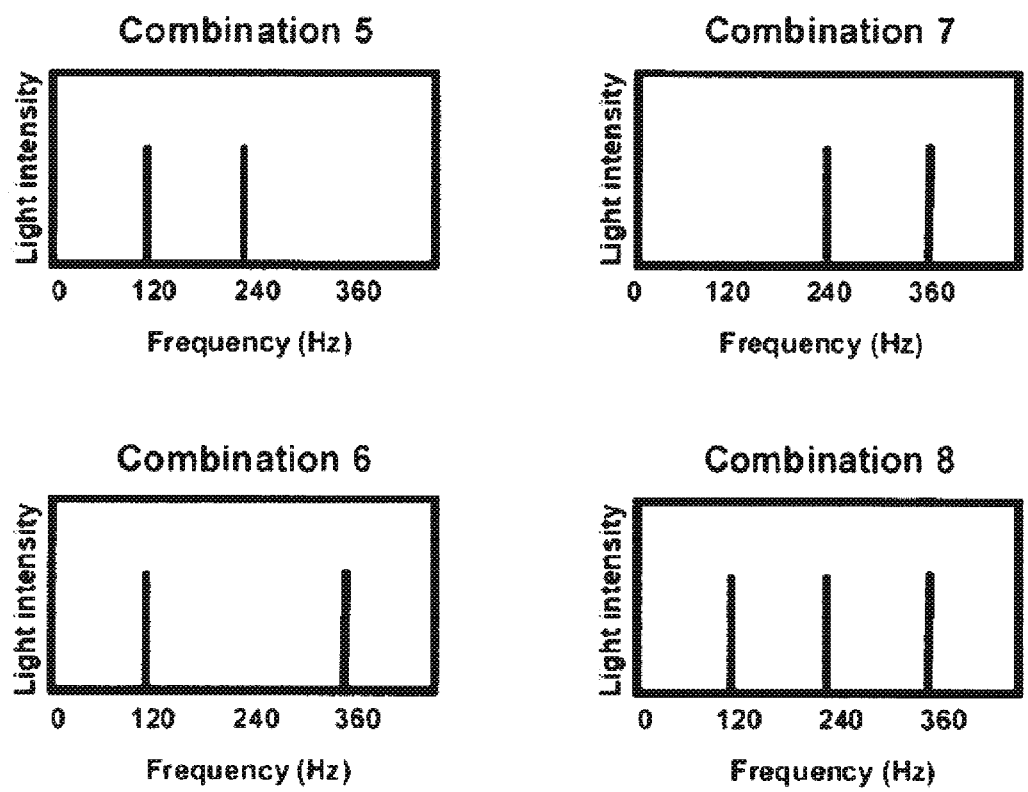

The frequency domain representations of each of these eight subcarrier frequency combinations are graphically plotted in FIGS. 13a and 13b. The DSP unit 26 determines the identity of the active pen tool 180 by analyzing the frequency domain representation 312 of the light intensity variation 310 and determining which frequencies are present above a certain threshold. If no frequencies are present in the frequency domain representation, as in the case of combination 1, then the interactive input system 20 determines that the pointer is passive.

Figure 14:
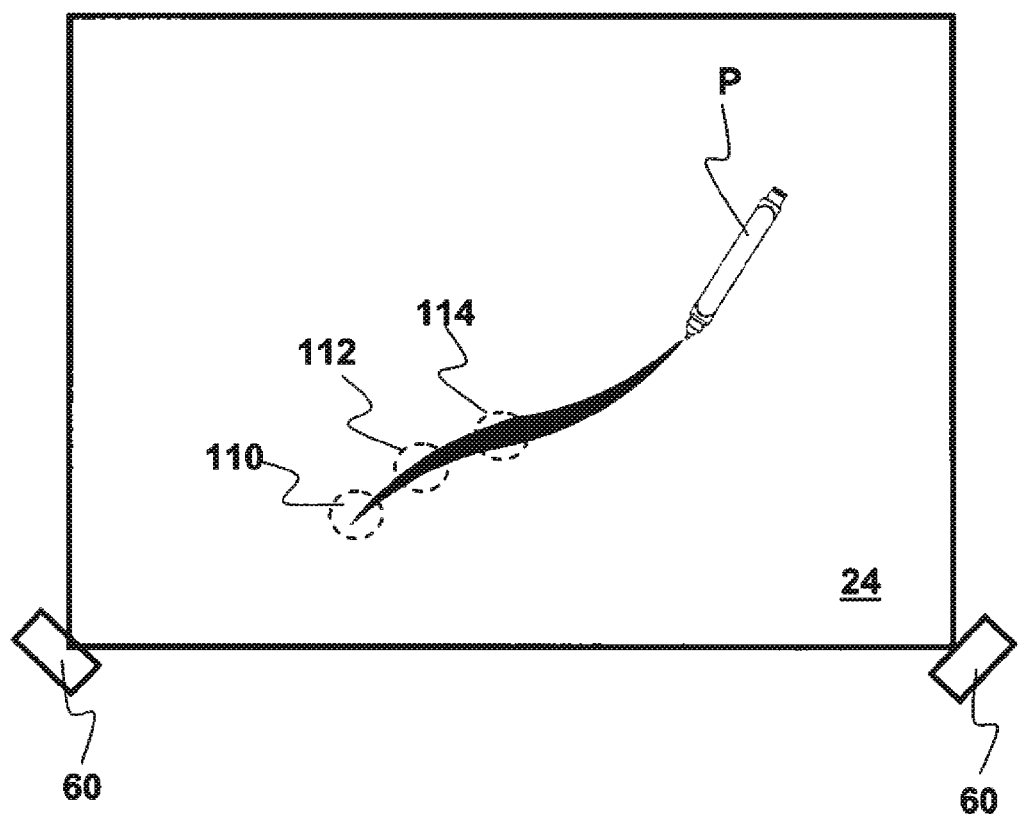
FIG. 14 is a front view of an input surface of the interactive input system of FIG. 1, showing a pen tool applying pressure sensitive input.
Figure 15A:
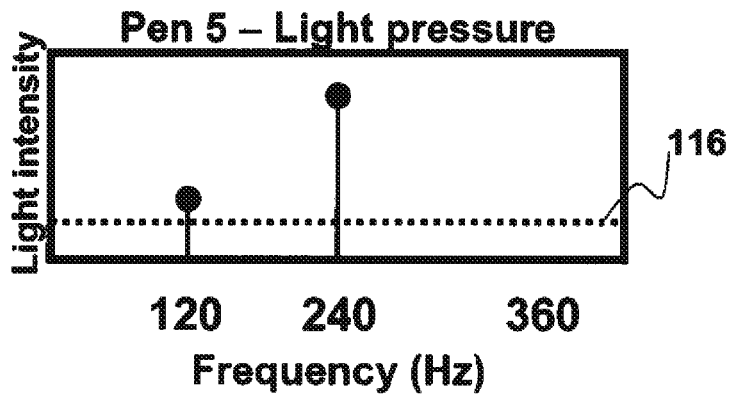
FIGS. 15a to 15c are graphical plots of frequency domain representations corresponding to the pressure sensitive input of FIG. 14.
Figure 15B:
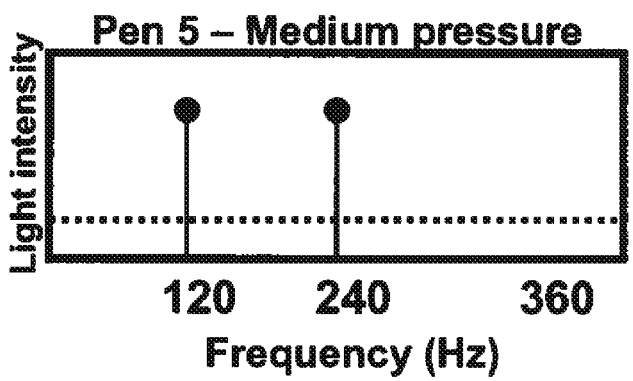
Figure 15C:
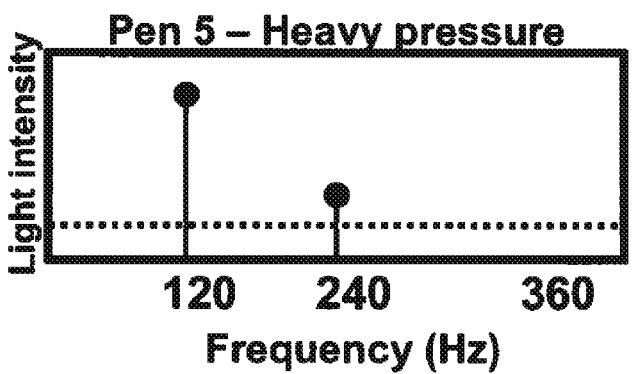

If desired, additional information about the pen tool, such as the pressure applied to the pen tool tip, may be communicated by the pen tool 180 by increasing both the number of subcarrier frequencies available for modulation as well as the frame rate of the imaging assemblies 60. Alternatively, the amplitude of the subcarrier frequencies may be varied. This method can be used for the subcarrier frequency combinations that comprise more than one subcarrier frequency, namely combinations 5, 6, 7 and 8 in FIGS. 13a and 13b. Pen tools using these subcarrier frequency combinations may be encoded such that the pen tip pressure is manifested as a difference in amplitude of one or more subcarrier frequencies. FIG. 14 schematically illustrates the motion of a pen tool P across the display surface 24, during which the pressure applied to the tip of the pen tool P varies from light pressure (110), to medium pressure (112) to heavy pressure (114). The subcarrier frequency signal modulation corresponding to each of these regions is plotted graphically in FIGS. 15*a* to 15*c*, respectively. The difference in amplitude of the subcarriers for a different combination is kept on the order of +/−25% in order to maintain the intensity of all subcarriers above the threshold for detection. Pen tools using subcarrier frequency combinations comprising fewer than two subcarrier frequencies, namely subcarrier frequency combinations 1, 2, 3, and 4, could be assigned to pen tool functions that do not require pressure sensitivity, such as for example "eraser", "right click", "left click" and the like.

To utilize such a pressure sensitive feature, the active pen tools may comprise a pressure-sensitive tip. In particular, the pressure-sensitive tip may comprise a pressure sensor coupled to the actuator 186. Active pen tools without a pressure-sensitive tip could still be used with a pressure-sensitive capable interactive input system, but would give rise to an intensity profile in which the subcarriers have the same amplitude.

After the location, the identity and the tip pressure (if available) of the pointer have been determined, the controller 120 uses the pointer positions determined from the composite image frame 306 generated for each imaging assembly 60 to calculate the position of the pointer in (x,y) coordinates relative to the display surface 24 using well known triangulation such as that described in above-incorporated U.S. Pat. No. 6,803,906 to Morrison et al. The calculated pointer coordinate and the pointer identity and tip pressure (if available) are then conveyed by the controller 120 to the general purpose computing device 30 via the USB cable 32. The general purpose computing device 30 in turn processes the received pointer coordinate, identification and tip pressure (if available) and updates the image output provided to the display unit, if required, so that the image presented on the display surface 24 reflects the pointer activity. In this manner, pointer interaction with the display surface 24 can be recorded as writing or drawing or used to control execution of one or more application programs running on the computer 30.

Figure 16:
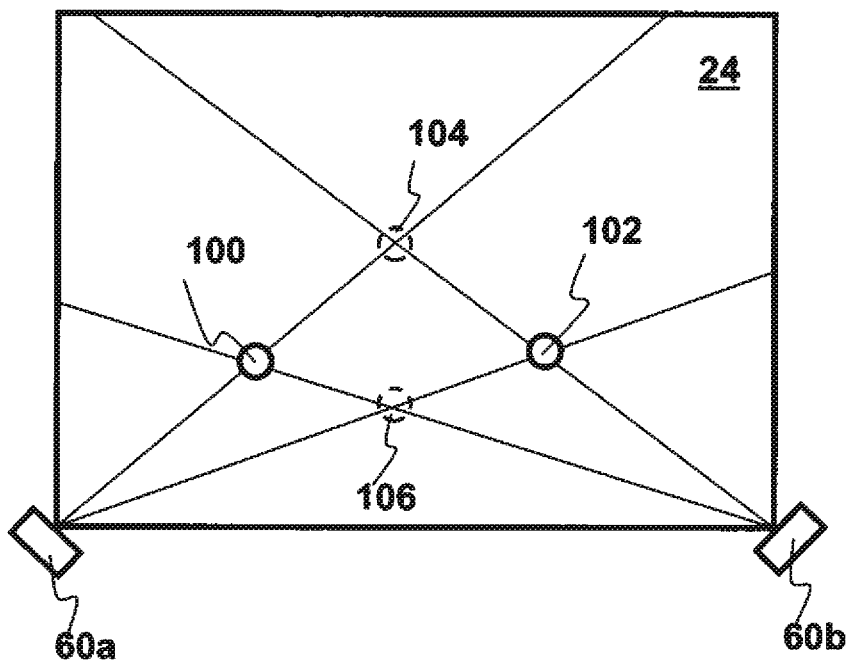
FIG. 16 is a front view of an input surface of the interactive input system of FIG. 1 showing actual and imaginary locations of multiple pointers.
Figure 17A:
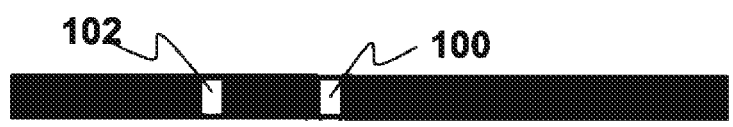
FIGS. 17a and 17b are views across the input surface depicted in FIG. 16 as seen by respective imaging assemblies.
Figure 17B:
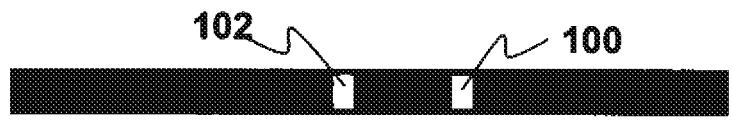

Those of skill in the art will appreciate that the use of pen tools 180 with modulated IR light emissions allows multiple pointers of any kind (that is, active or passive) within the region of interest to be disambiguated from each other and thus more accurately tracked. When two pointers are brought into proximity with the display surface 24 at points 100 and 102, as illustrated in FIG. 16, imaging assemblies 60*a* and 60*b* each capture respective image frames and the DSP unit 26 attempts to locate the positions of the pointers by triangulation as described above. As imaging assemblies 60*a* and 60*b* are positioned at different locations, the views of the imaging assemblies 60*a* and 60*b* differ, as is illustrated schematically in FIGS. 17*a* and 17*b*, respectively. Disambiguation normally occurs as the interactive input system 20 cannot distinguish if the pointers are located at points 100 and 102, or at points 104 and 106. However, by utilizing pen tools 180 each emitting modulated IR light having a unique subcarrier frequency combination, the interactive input system 20 is able to identify the pen tools 180 and accurately distinguish between the two pointers and thereby triangulate their positions. Even if one of the two pointers is a passive pointer, such as a finger or passive stylus, the interactive input system 20 is still able to differentiate between the two pointers and is able to determine their positions accurately by triangulation. It is possible to distinguish between more than two pointers using this technique provided no more than one of the pointers is passive.

Figure 18:
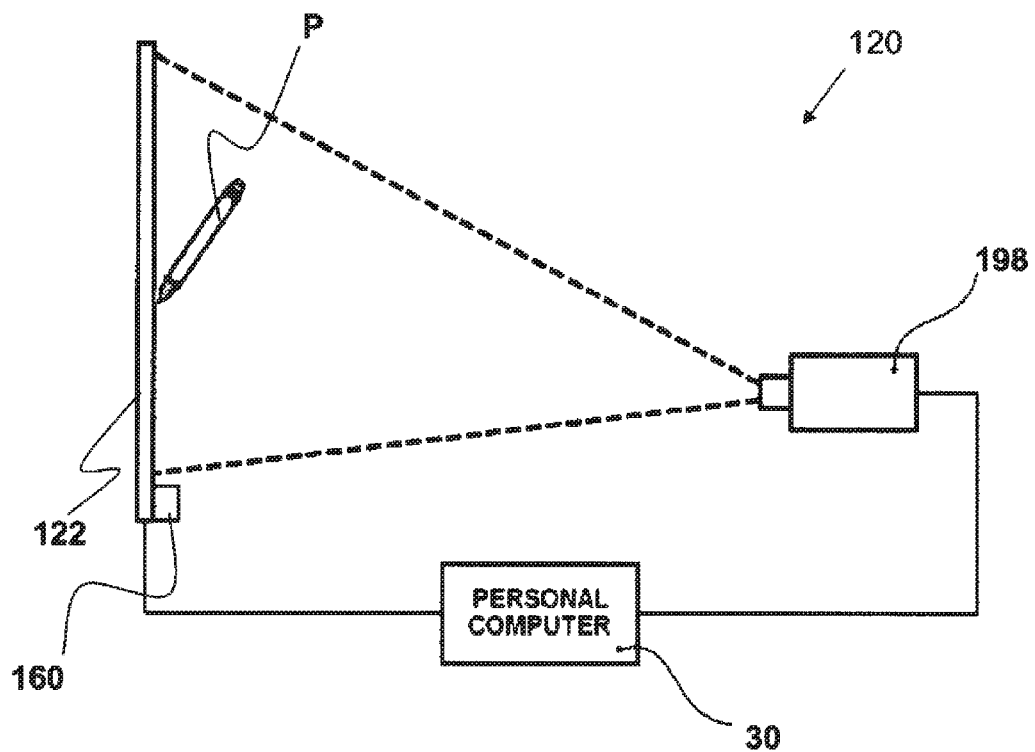
FIG. 18 is a side view of another embodiment of an interactive input system.

The pen tool information input method described above may be used in a wide variety of interactive input systems, including interactive input systems using a front projector, interactive input systems having only one imaging assembly, and interactive input systems having more than two imaging assemblies. For example, FIG. 18 shows another embodiment of an interactive input system 120 comprising an assembly 122 surrounding a display surface of a front projection system. The front projection system utilizes a projector 198 that projects images on the display surface. Imaging assemblies 160 positioned at the bottom corners of the assembly 122 look across the display surface. A DSP unit (not shown) receives image frames captured by the imaging assemblies 160 and carries out the image processing method described previously to locate the position of each pointer brought into proximity with the display surface and to determine if information is being transmitted by a pen tool 180.

Figure 19:
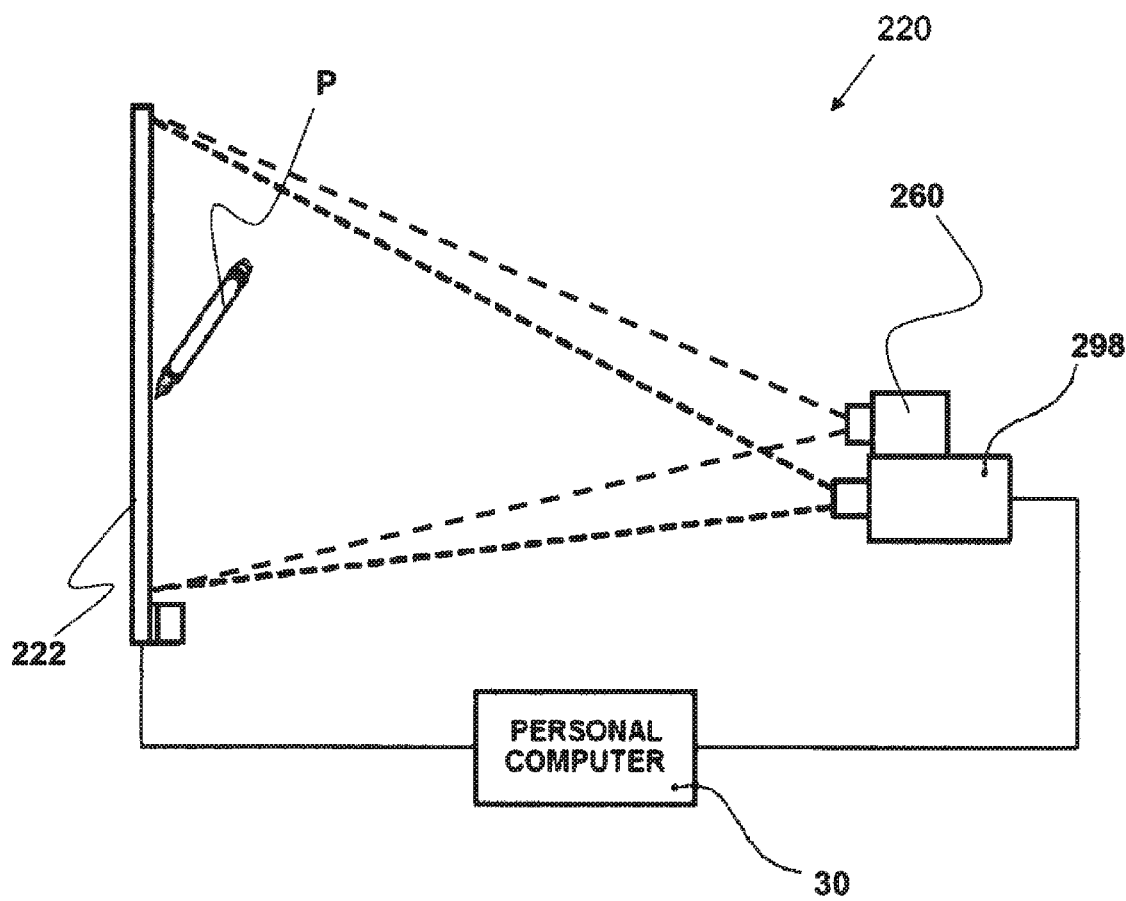
FIG. 19 is a side view of yet another embodiment of an interactive input system.

FIG. 19 shows another embodiment of an interactive input system using a front projection system. Interactive input system 220 comprises a single imaging assembly 260 positioned in proximity to a projector 298 and configured for viewing the display surface. A DSP unit (not shown) receives image frames captured by the imaging assembly 260 and carries out the image processing method described previously to locate the position of a pointer brought into proximity with the display surface and to determine if information is being transmitted by a pen tool 180.

Figure 20A:
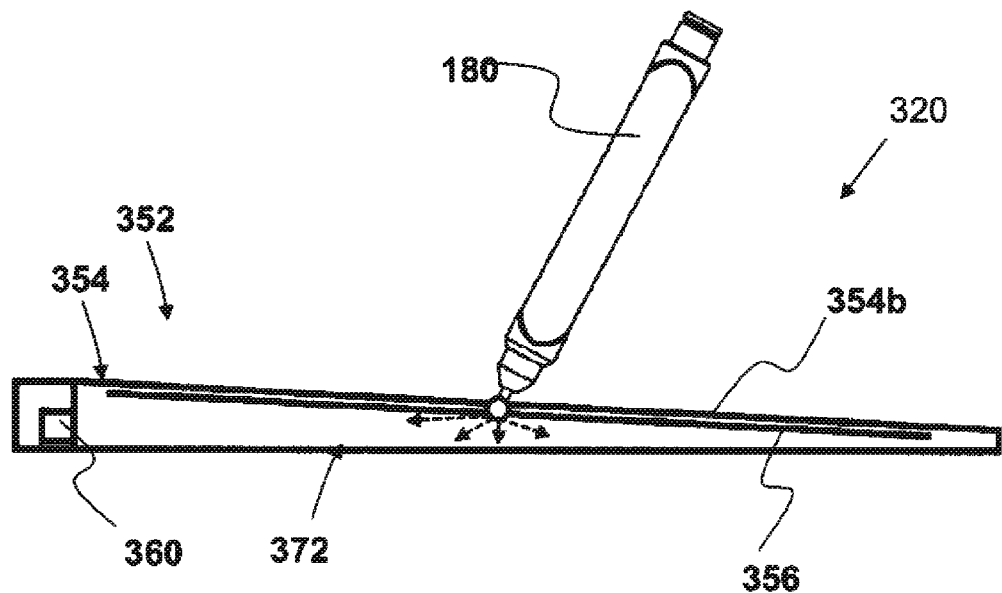
FIGS. 20a and 20b are cross-sectional side and perspective views, respectively, of yet another embodiment of an interactive input system.
Figure 20B:
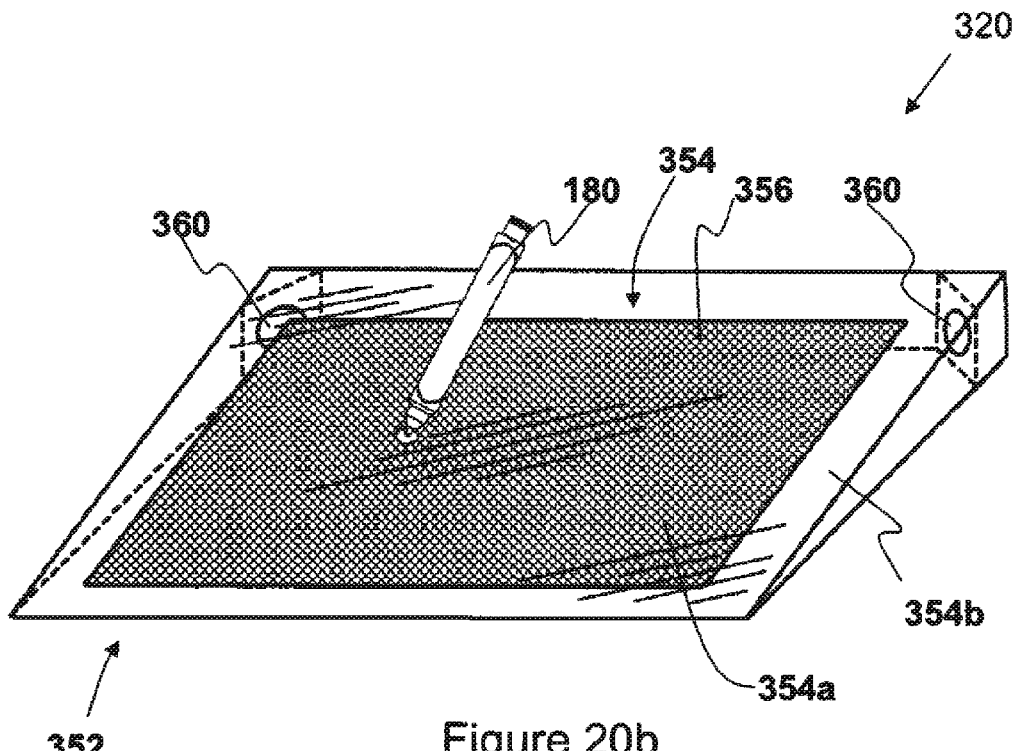

FIGS. 20*a* and 20*b* show yet another embodiment of an interactive input system, generally indicated by reference numeral 320, which is configured as a wireless slate. Interactive input system 320 comprises a generally clear panel or tablet 352 formed of energy transmissive material such as for example glass, acrylic or other suitable material. The panel 352 in this embodiment is generally wedged-shaped and provides an inclined, generally rectangular, upper input surface 354 that slopes downwardly from back to front. Energy dispersing structure in the form of a rectangular diffusive layer 356 is embedded in the panel 352 and is positioned slightly below the input surface 354. The diffusive layer 356 in this embodiment is formed of V-CARE® V-LITE® barrier fabric manufactured by Vintex Inc. of Mount Forest, Ontario, Canada and has a footprint that is smaller than the footprint of the input surface 354, however those of skill in the art will understand that other diffusive materials may also be used. The portion of the input surface 354 directly overlying the diffusive layer 356 forms an active input region or area 354*a* that is surrounded by an inactive border region 354*b*. A pair of imaging assemblies 360 is accommodated by the panel 352. Each imaging assembly 360 is positioned adjacent a different back corner of the panel 352 and is oriented so that the field of view of the imaging assembly 360 is aimed into the panel 352 between the diffusive layer 356 and a bottom surface 372 of the panel 352 and upwardly across the undersurface of the diffusive layer 356.

When the pen tool 180 is brought into contact with the input surface 354 of the panel 352 and emits modulated infrared light, the modulated infrared light that enters into the panel 32. If the pointer 180 contacts the input surface 354 within the active input region 354*a*, the modulated infrared light entering the panel 352 impinges on and is dispersed by the diffusive layer 356. Some of the dispersed light is directed towards the imaging assemblies 360 and thus, the imaging assemblies 360 see a bright region on the diffusive layer 56. This bright region appears in captured image frames on an otherwise dark background. A DSP unit (not shown) receives image frames captured by the imaging assemblies 360 and carries out the image processing method described previously to locate the position of the pen tool 180 brought into contact with the input surface 354 and to determine the information represented by the subcarrier frequency combination.

Figure 21:
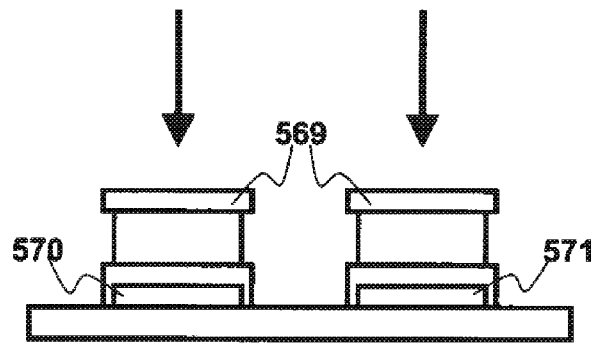
FIG. 21 is a side elevation view of image sensors for use in imaging assemblies of the interactive input system of FIG. 1.
Figure 22:
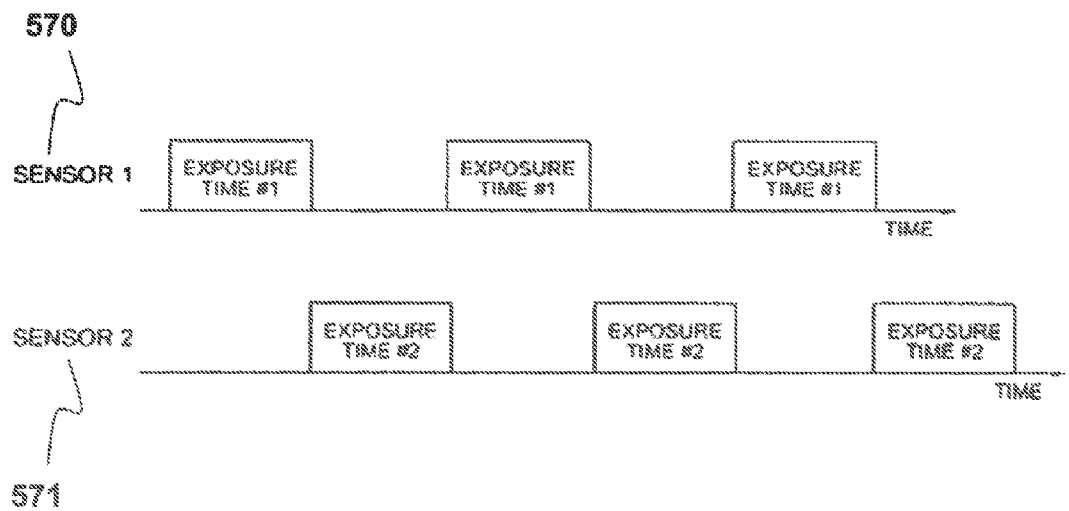
FIG. 22 is a schematic view of a timing sequence used for operation of the image sensors of FIG. 21.
Figure 23:
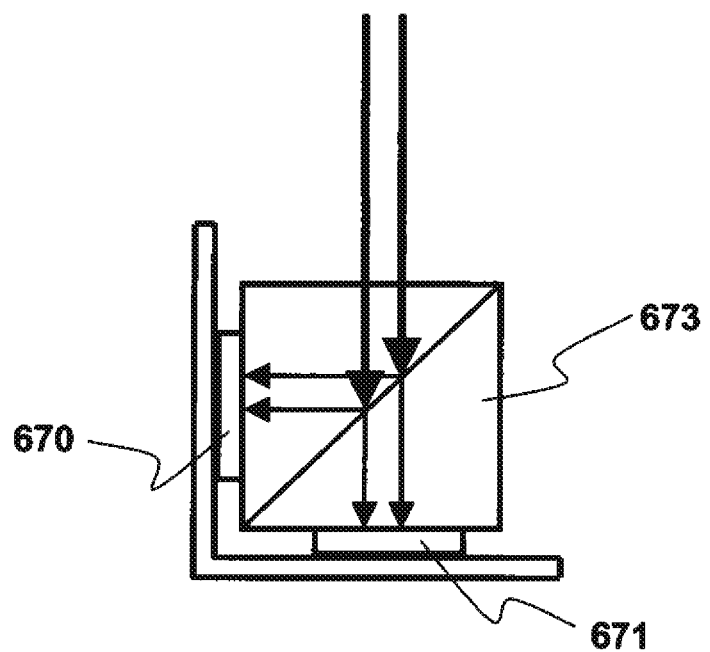
FIG. 23 is a cross-sectional side view of an imaging assembly for use with the interactive input system of FIG. 1.

In the embodiments described above, each imaging assembly comprises a single image sensor. Alternatively, the imaging assemblies may comprise two or more lower speed image sensors positioned adjacent to each other such that they have generally the same view. FIG. 21 illustrates a pair of image sensors 570 and 571 positioned adjacent each other within an imaging assembly. Here, image sensors 570 and 571 view a region of interest through respective lens assemblies 569. The processing of image data captured by image sensors 570 and 571 is synchronized to effectively double the frame rate provided by the image sensors 570 and 571. The timing of this synchronization is illustrated in FIG. 22. Here, image sensors 570 and 571 are each capable of capturing images at a rate of N/2 frames per second and using an exposure time of 1/N seconds. The synchronization involves the staggering of the exposure periods of the image sensors 570 and 571, such that the exposure periods generally do not overlap. Still other multiple sensor arrangements are possible. For example, FIG. 23 illustrates a pair of image sensors 670 and 671 positioned adjacent each other at different orientations and adjacent a beam splitter 673. Here, modulated IR light emitted by a pen tool 180 passes through the beam splitter and enters the image sensors 670 and 671, such that image sensors 670 and 671 see "mirrors" of the same image.

Figure 24:
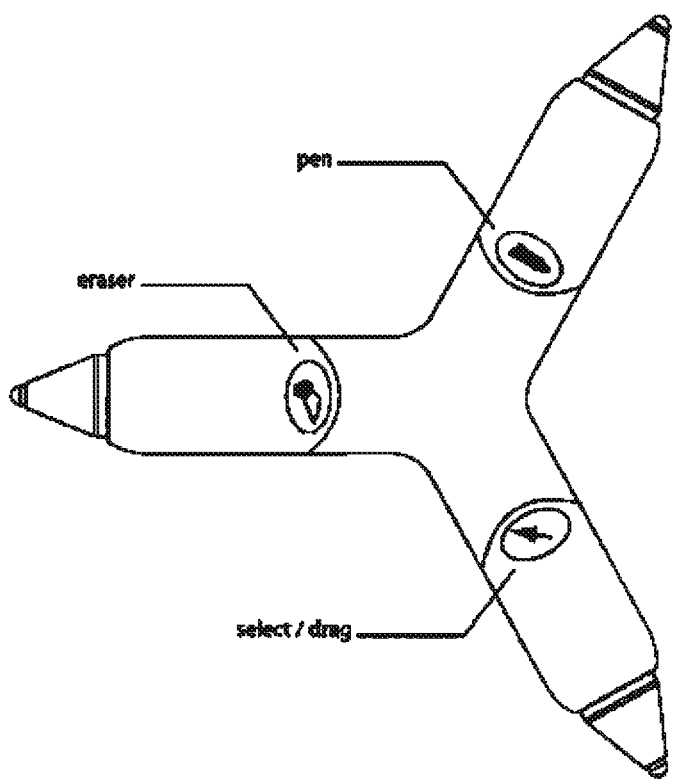
FIG. 24 is a plan view of another embodiment of an input tool for use with the interactive input system of FIG. 1.

The pen tool 180 can have a single tip, such as that illustrated in FIG. 5. Alternatively, the pen tool may have multiple tips, such as that illustrated in FIG. 24, with each tip configured to emit IR light that has been modified by a unique subcarrier frequency. Other pen tools, such as for example those described in U.S. patent application Ser. No. 12/118, 535 to Bolt et al., the content of which is incorporated herein by reference, may also be used.

As described above, the pen tool 180 emits the modulated IR light upon triggering of a tip-switch that depresses upon contacting the display surface 24. Alternatively, the pen tool may emit modulated IR light by a user manipulated switch, or may emit light constantly, or only when an accelerometer senses movement, for example, so as to conserve battery power.

Although in embodiments described above, the frame rate of the imaging assemblies is 960 Hz, the cycling rate of the IR light sources is 480 Hz, and the subcarrier frequencies are 120 Hz, 240 Hz, and 360 Hz, those of skill in the art will appreciate that the interactive input system is not limited to these frequencies. For example, the imaging assemblies may be capable of very high frame rates, such as those on the order of $10^6$ frames per second, or very low frame rates, such as 30 frames per second. Although the amount of information that may be transmitted increases as the frame rate increases, the systems and methods described above are feasible using imaging assemblies having low frame rates.

Although in embodiments described above the IR light sources are cycled at a rate that is half of the frame rate, in other embodiments, the IR light sources may alternatively be cycled at other rates, such as ⅓, ¼ or ¹⁄₁₀₀ of the frame rate, for example. In interactive input systems using light sources that cycle at rates less than that of the frame rate, such as ¹⁄₁₀₀ the frame rate, any images frames captured while the IR light sources are off can be used for analyzing the light intensity of any active pen tools present to identify the pointers and other information such as tip pressure, while image frames captured while the IR light sources are on can be used for ambient light removal and pointer triangulating.

Although in embodiments described above the composite image frame is formed by subtracting each (−) image from the previous (+) image within a series of eight successive image frames to produce a series of four difference image frames and then summing these difference image frames to yield a composite image frame, in other embodiments, the composite image frame may be formed using an alternative approach. For example, the difference image frames may be averaged. In still other embodiments, a number of image frames other than eight may be used. In still other embodiments, non-successive image frames may alternatively be used for forming the composite image frame.

While in embodiments described above the pointer analysis region is square, it will be appreciated that this region is not limited to this shape. Accordingly, the pointer analysis region may be other shapes, such as rectangular, circular etc. In other embodiments, the shape of the pointer analysis region encompasses the complete bezel.

Although in embodiments described above a single pointer analysis region is used to locate the pointer, in other embodiments, multiple pointer analysis regions may be used.

Although in embodiments described above, information relating to pen tip pressure is communicated to the interactive input system by varying the amplitude of the subcarrier frequencies, in other embodiments, pen tip pressure may alternatively be communicated by being assigned to a respective subcarrier frequency.

Although in embodiments described above, the bezel segments comprise bands of retro-reflective material that are illuminated by IR light sources, in other embodiments, the bezels do not comprise retro-reflective material and are therefore non-reflective. In such other embodiments, the IR light sources may not be present, and the interactive input system may instead rely solely on the light emitted by the active pen tools for locating the pointer within the field of view of the imaging assemblies. Here, the bezel segments would be generally dark and the illumination emitted by the active pen tool would be filtered to pass the dc frequency component by adding each of the eight successive image frames together. Sources of illumination with a dc frequency component, such as ambient light and active pens, would appear bright against a generally dark background. Once a bright point has been found, the modulator is applied to determine whether it is an active pen or other source of unwanted light. In still other embodiments, the previous method may be used in conjunction with no bezel associated with the touch surface.

Although in embodiments described above, the bezel segments comprises bands of retro-reflective material that are illuminated by IR light sources, in other embodiments, an illuminated bezel, as is described in U.S. Pat. No. 6,972,401 to Akitt et al. may be employed.

Although in the embodiments described above, the pen tool 180 and the light sources 82 emit infrared radiation, in other embodiments, radiation of other wavelengths may alternatively be emitted.

Although preferred embodiments have been described, those of skill in the art will appreciate that variations and modifications may be made with departing from the spirit and scope thereof as defined by the appended claims.

What is claimed is:

1. An interactive input system comprising:
   at least one light source configured to emit radiation at a particular frequency into a region of interest;
   at least one imaging assembly having a field of view aimed into the region of interest into which at least one active pointers are brought and capturing image frames, each active pointer emitting modulated radiation comprising a combination of subcarrier frequencies unique thereto, each of the subcarrier frequencies being different than the particular frequency; and processing structure in communication with the at least one imaging assembly and processing captured image frames to detect the existence of a pointer therein, when an active pointer exists in captured image frames, said processing structure demodulating the captured image frames to determine frequency components thereof and examining the frequency components to determine the subcarrier frequency combination of the modulated radiation emitted by the active pointer and thereby to determine at least one predefined attribute of said active pointer and to determine the amplitudes of the subcarrier frequencies of the determined subcarrier frequency combination and thereby to determine another attribute of said active pointer.

2. The interactive input system of claim 1, wherein during demodulating the processing structure applies a transform to the captured image frames.

3. The interactive input system of claim 1, wherein the active pointer is a pen tool emitting modulated radiation into the region of interest.

4. The interactive input system of claim 3, wherein the modulated radiation emitted by the pen tool is infrared radiation.

5. The interactive input system of claim 1, wherein the at least one predefined attribute comprises one of pointer input colour and pointer functionality.

6. The interactive input system of claim 5, wherein the pointer functionality is one of a right mouse click, a left mouse click, and an erasing action.

7. The interactive input system of claim 1, wherein the at least one imaging assembly comprises at least two imaging assemblies.

8. The interactive input system of claim 7, wherein during demodulating the processing structure applies a transform to the captured image frames.

9. The interactive input system of claim 7, wherein the active pointer is a pen tool.

10. The interactive input system of claim 7, wherein the at least one light source is cycled between on and off states.

11. The interactive input system of claim 10, wherein each of said imaging assemblies captures successive image frames, one image frame being captured when the at least one light source is in the on state and one image frame being captured when the at least one light source is in the off state.

12. The interactive input system of claim 11, wherein said processing structure subtracts image frames captured when the at least one light source is in the off state from image frames captured when at least one light source is in the on state to form difference image frames, sums the difference image frames to form a composite image frame, and determines a location of the pointer in the composite image frame.

13. The interactive input system of claim 12, wherein said processing structure further defines an analysis region associated with the pointer location in the composite image frame, and examines frequency components derived from portions of the captured image frames corresponding to the analysis region.

14. The interactive input system of claim 9, wherein the pen tool comprises a pressure sensitive tip, and the pen tool further modulates emitted modulated radiation according to tip pressure.

15. The interactive input system of claim 7, wherein each of the imaging assemblies comprises at least two light sensors having generally identical views of the region of interest and capturing the image frames, the at least two light sensors having exposure periods that are generally staggered.

16. The interactive input system of claim 7, further comprising a bezel at least partially surrounding the region of interest and having a surface in the field of view of said at least two imaging assemblies.

17. The interactive input system of claim 7, wherein the radiation emitted by the at least one light source is infrared radiation.

18. The interactive input system of claim 9, wherein the modulated radiation emitted by the pen tool is infrared radiation.

19. The interactive input system of claim 7, wherein the at least one predefined attribute comprises one of pointer input colour and pointer functionality.

20. The interactive input system of claim 19, wherein the pointer functionality is one of a right mouse click, a left mouse click, and an erasing action.

21. A method of inputting information into an interactive input system comprising:

emitting, by at least one light source, radiation at a particular frequency into a region of interest;

capturing, by at least one imaging assembly, image frames of the region of interest into which at least one active pointers are brought, each active pointer emitting modulated radiation comprising a combination of subcarrier frequencies unique thereto, each of the subcarrier frequencies being different than the particular frequency;

processing the captured image frames to detect the existence of a pointer therein; and when an active pointer exists in captured image frames, demodulating the captured image frames to determine frequency components thereof and examining the frequency components to determine the subcarrier frequency combination of the modulated radiation emitted by the active pointer and thereby to determine at least one predefined attribute of the active pointer and to determine the amplitudes of the subcarrier frequencies of the determined subcarrier frequency combination and thereby to determine another attribute of said active pointer.

22. The method of claim 21, wherein the demodulating further comprises applying a transform to the captured image frames.

23. The method of claim 21, wherein the active pointer is a pen tool.

24. The method of claim 21, wherein the at least one light source is cycled between on and off states.

25. The method of claim 24, wherein the captured image frames comprise image frames captured in the on and off states.

26. The method of claim 24, further comprising:

generating a composite image frame by subtracting image frames captured in the off state from image frames captured in the on state to form difference image frames, and summing the difference image frames;

determining a location of the pointer in the composite image frame; and defining an analysis region associated with the pointer location in the composite image frame, wherein the examining is carried out with respect to frequency components derived from portions of the captured image frames corresponding to the analysis region.

27. The method of claim 21, wherein the at least one predefined attribute is selected from the group consisting of pointer input colour and pointer functionality.

28. The method of claim 27, wherein the pointer functionality is one of a right mouse click, a left mouse click, and an erasing action.

29. The method of claim 21 wherein the combination of subcarrier frequencies unique to each active pointer comprises at least three different subcarrier frequencies.

30. The method of claim 24 wherein the combination of subcarrier frequencies unique to each active pointer comprises at least three different subcarrier frequencies.

31. The method of claim 27 wherein the combination of subcarrier frequencies unique to each active pointer comprises at least three different subcarrier frequencies.

32. The interactive input system of claim 1 wherein the combination of subcarrier frequencies unique to each active pointer comprises at least three different subcarrier frequencies.

33. The interactive input system of claim 5 wherein the combination of subcarrier frequencies unique to each active pointer comprises at least three different subcarrier frequencies.

34. The interactive input system of claim 7 wherein the combination of subcarrier frequencies unique to each active pointer comprises at least three different subcarrier frequencies.

35. The interactive input system of claim 1, wherein the processing structure is configured to determine differences between the amplitudes of the subcarrier frequencies of the determined subcarrier frequency combination to determine the other attribute.

36. The interactive input system of claim 35, wherein the other attribute is pressure applied by the active pointer to a surface in the field of view of the at least one imaging assembly, and wherein the determined differences correlate to the pressure.

37. The method of claim 21, further comprising determining differences between the amplitudes of the subcarrier frequencies of the determined subcarrier frequency combination to determine the other attribute.

38. The method of claim 37, wherein the other attribute is pressure applied by the active pointer to a surface in the field of view of the at least one imaging assembly, and wherein the determined differences correlate to the pressure.

* * * * *